United States Patent
Li et al.

(10) Patent No.: US 10,919,025 B2
(45) Date of Patent: Feb. 16, 2021

(54) N₂O REMOVAL FROM AUTOMOTIVE EXHAUST FOR LEAN/RICH SYSTEMS

(71) Applicant: BASF CORPORATION, Florham Park, NJ (US)

(72) Inventors: Yuejin Li, Edison, NJ (US); Shiang Sung, New York, NY (US); Stanley D. Roth, Yardley, PA (US); Torsten Neubauer, Langenhagen (DE); Susanne Stiebels, Adenbuettel (DE)

(73) Assignee: BASF Corporation, Florham Park, NJ (US)

( * ) Notice: Subject to any disclaimer, the term of this patent is extended or adjusted under 35 U.S.C. 154(b) by 0 days.

(21) Appl. No.: 16/751,841

(22) Filed: Jan. 24, 2020

(65) Prior Publication Data

US 2020/0156046 A1    May 21, 2020

Related U.S. Application Data

(63) Continuation of application No. PCT/IB2018/055613, filed on Jul. 26, 2018.

(60) Provisional application No. 62/537,624, filed on Jul. 27, 2017.

(51) Int. Cl.
| | | |
|---|---|---|
| *B01J 23/46* | (2006.01) | |
| *B01J 23/42* | (2006.01) | |
| *B01J 23/44* | (2006.01) | |
| *B01J 23/52* | (2006.01) | |
| *B01J 23/50* | (2006.01) | |
| *B01J 23/34* | (2006.01) | |
| *B01J 23/745* | (2006.01) | |
| *B01J 23/72* | (2006.01) | |
| *B01J 23/14* | (2006.01) | |
| *B01J 23/75* | (2006.01) | |
| *B01J 23/755* | (2006.01) | |
| *B01J 23/89* | (2006.01) | |
| *B01J 23/10* | (2006.01) | |
| *B01J 21/04* | (2006.01) | |
| *B01J 21/08* | (2006.01) | |
| *B01J 35/10* | (2006.01) | |
| *B01D 53/94* | (2006.01) | |

(52) U.S. Cl.
CPC ........ *B01J 23/464* (2013.01); *B01D 53/9422* (2013.01); *B01D 53/9427* (2013.01); *B01J 21/04* (2013.01); *B01J 21/08* (2013.01); *B01J 23/10* (2013.01); *B01J 23/14* (2013.01); *B01J 23/34* (2013.01); *B01J 23/42* (2013.01); *B01J 23/44* (2013.01); *B01J 23/462* (2013.01); *B01J 23/468* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 23/8926* (2013.01); *B01J 35/1014* (2013.01); *B01J 35/1019* (2013.01); *B01D 2255/104* (2013.01); *B01D 2255/106* (2013.01); *B01D 2255/1021* (2013.01); *B01D 2255/1023* (2013.01); *B01D 2255/1025* (2013.01); *B01D 2255/1026* (2013.01); *B01D 2255/1028* (2013.01); *B01D 2255/2065* (2013.01); *B01D 2255/2073* (2013.01); *B01D 2255/2094* (2013.01); *B01D 2255/20738* (2013.01); *B01D 2255/20746* (2013.01); *B01D 2255/20753* (2013.01); *B01D 2255/20761* (2013.01); *B01D 2255/908* (2013.01); *B01D 2255/9207* (2013.01)

(58) Field of Classification Search
CPC .. F01N 2570/145; F01N 3/0842; F01N 3/106; F01N 2240/18; F01N 2250/12; F01N 2570/14; B01D 53/9427; B01D 53/56; B01D 53/565; B01D 53/9409; B01D 53/9413; B01D 2255/102; B01D 2255/2065; B01D 2255/407; B01D 2257/402; B01D 2258/012; B01J 23/40; B01J 23/63
See application file for complete search history.

(56) References Cited

U.S. PATENT DOCUMENTS

| | | | |
|---|---|---|---|
| 3,915,896 A | 10/1975 | Oliver | |
| 5,895,772 A * | 4/1999 | Grigorova | B01J 23/63 502/304 |
| 5,925,590 A | 7/1999 | White et al. | |
| 7,850,842 B2 | 12/2010 | Hofstadt et al. | |
| 7,879,755 B2 * | 2/2011 | Wassermann | B01D 53/945 502/304 |
| 9,610,564 B2 * | 4/2017 | Xue | B01D 53/9481 |
| 2005/0202966 A1 * | 9/2005 | Jantsch | B01J 37/0242 502/325 |
| 2006/0008401 A1 * | 1/2006 | Hotta | B01J 23/8906 423/239.1 |
| 2016/0167022 A1 * | 6/2016 | Chiffey | B01J 35/0006 423/213.2 |

(Continued)

FOREIGN PATENT DOCUMENTS

| | | |
|---|---|---|
| CN | 106944048 A | 7/2017 |
| DE | 102008048159 | 4/2010 |

(Continued)

*Primary Examiner* — Timothy C Vanoy
(74) *Attorney, Agent, or Firm* — Finnegan, Henderson, Farabow, Garrett & Dunner LLP

(57) ABSTRACT

A nitrous oxide (N₂O) removal catalyst composition for treating an exhaust stream of an internal combustion engine is provided, containing a platinum group metal (PGM) component on a metal oxide-based support, wherein the N₂O removal catalyst composition is in a substantially reduced form, such that it has an oxygen deficiency of about 0.05 mmol oxygen atoms/g or greater, and wherein the N₂O removal catalyst composition provides effective removal of at least a portion of N₂O from the exhaust stream under lean conditions at a temperature of about 350° C. or lower. N₂O removal catalytic articles, systems, and methods are also provided for removing at least a portion of N₂O from an exhaust stream under lean, low temperature conditions.

27 Claims, 12 Drawing Sheets

Related U.S. Application Data

(56) References Cited

U.S. PATENT DOCUMENTS

| | | | |
|---|---|---|---|
| 2018/0078900 A1* | 3/2018 | Andersen | B01J 37/0201 |
| 2018/0078922 A1* | 3/2018 | Deuerlein | B01J 23/6525 |
| 2019/0009254 A1* | 1/2019 | Clowes | B01J 35/04 |

FOREIGN PATENT DOCUMENTS

| | | | | |
|---|---|---|---|---|
| EP | 3 493 901 A1 * | 6/2019 | | B01J 23/63 |
| ES | 2 356 459 A1 * | 4/2011 | | B01J 35/006 |
| KR | 20060019035 | 3/2006 | | |
| KR | 101797919 B1 * | 11/2017 | | F01N 3/0842 |
| WO | WO1991-01175 A1 | 2/1991 | | |
| WO | WO2016/094399 | 6/2016 | | |
| WO | WO2017153894 A1 | 9/2017 | | |
| WO | WO2018/185665 | 10/2018 | | |

* cited by examiner

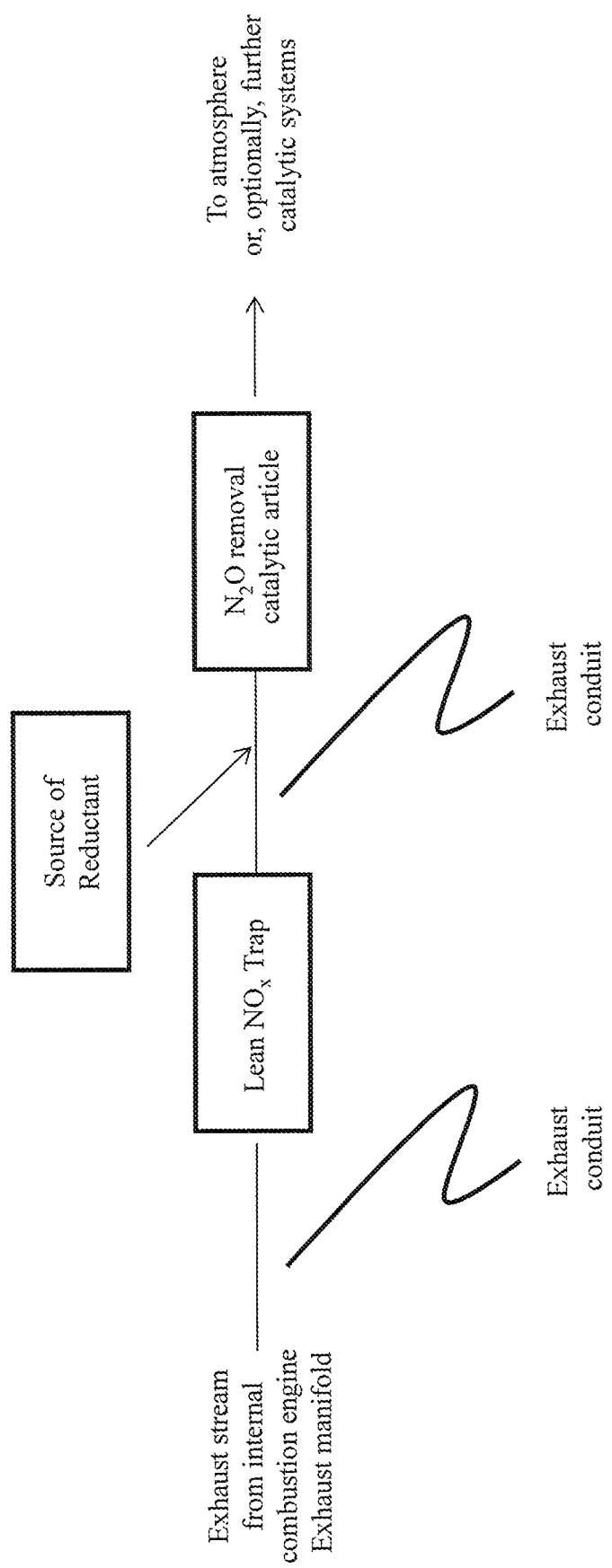

N₂O REMOVAL FROM AUTOMOTIVE EXHAUST FOR LEAN/RICH SYSTEMS

CROSS-REFERENCE TO RELATED APPLICATIONS

This application is a continuation of International Application No. PCT/IB2018/055613; filed Jul. 26, 2018, which International Application was published by the International Bureau in English on Jan. 31, 2019, and which claims priority to U.S. Provisional Application No. 62/537,624; filed Jul. 27, 2017, the content of each of which is hereby incorporated by reference in its entirety.

FIELD OF THE INVENTION

The present disclosure pertains to catalytic compositions, articles, systems and methods for removal of nitrous oxide ($N_2O$) from an exhaust stream of an internal combustion engine. More particularly, the disclosure relates to catalytic compositions, articles, systems and methods for effective removal of at least a portion of $N_2O$ emissions from automotive exhaust under low temperature, lean conditions.

BACKGROUND OF THE INVENTION

Nitrous oxide ($N_2O$) is a greenhouse gas with a global warming potential of 300 times that of $CO_2$ and an atmospheric lifetime of 114 years. Automotive exhaust is one source of $N_2O$ emissions, as a by-product of fuel combustion and as a by-product formed during the catalytic reduction of nitrogen oxides ($NO_x$). $N_2O$ is formed under transient conditions over all major classes of emission control catalysts, including three-way conversion (TWC) catalysts for traditional/stoichiometric gasoline vehicles and for gasoline direct injection (GDI) vehicles, diesel oxidation catalysts (DOCs), catalyzed soot filters (CSFs), lean $NO_x$ traps (LNTs), selective catalytic reduction catalysts (SCRs), which reduce $NO_x$ with urea, and selective ammonia oxidation ($AMO_x$) catalysts for diesel vehicles.

Recognizing the global warming potential of $N_2O$, the United States Environmental Protection Agency (EPA) has already set an emission limit of 10 mg/mile for light-duty vehicles over the FTP cycle starting from MY2012, and a $N_2O$ emission limit of 0.1 g/bhp-h for heavy duty vehicles over the heavy duty FTP cycle starting from MY2014. In the past, automobile catalyst systems were optimized for maximum reduction of $NO_x$ (a regulated pollutant) without accounting for $N_2O$ level. The more stringent regulations currently on $N_2O$ emissions require that the emission control system design be optimized not only for high $NO_x$ conversion performance but also for low $N_2O$ emissions. Under the present standards, if $N_2O$ exceeds the 10 mg/mile limits, there is a penalty against CAFE fuel economy requirements. With world-wide nitrogen oxide $N_2O$ regulations becoming more stringent and average engine exhaust temperatures ever decreasing, controlling $N_2O$ emissions with current technologies is becoming more challenging.

It is generally understood that $N_2O$ can be decomposed industrially, e.g., in the context of treating off-gases from nitric acid and adipic acid production. The temperatures for these operations are much higher (>550° C.; for example, about 800-900° C.) than the temperature of typical automotive exhaust, and the process streams for these operations contain little water (<1%), unlike typical exhaust gas streams. There are many literature reports describing $N_2O$ decomposition catalysts, and most can be grouped into three categories: (1) supported rhodium (Rh), (2) metal oxides with a spinel structure, and (3) ion-exchanged zeolites. Such catalysts are usually in powder or pelleted form.

In DE102008048159, $N_2O$ in a gas stream is decomposed using a catalyst comprising rhodium supported on a gamma-alumina that is optionally doped with cerium (Ce) or gold (Au). KR20060019035 is directed to a method for removing nitrogen oxides using dual catalyst beds, wherein nitrogen oxides are decomposed into nitrogen and nitrous oxide using a bed of nitrogen oxide-reducing catalyst $Pt/V_x$—$P_y$— (material containing hydroxyl group)$_z$, and the nitrous oxide thus formed is then further decomposed into nitrogen and oxide using a bed of a nitrous oxide-decomposing catalyst comprising Rh and silver (Ag), namely, Rh—Ag/CeO$_2$/M1-M2-M3, where M1 is magnesium (Mg), barium (Ba) or strontium (Sr), M2 is aluminum (Al), iron (Fe), vanadium (V), gallium (Ga) or chromium (Cr), and M3 is zinc (Zn), nickel (Ni), or copper (Cu).

For a LNT system, the catalyst needs to be periodically regenerated with a rich transient to recover its $NO_x$ storage capacity (deNO$_x$). When this deNO$_x$ event takes place at low temperatures (250-300° C.), a large amount of $N_2O$ is generated during the transition from a lean to rich environment. There are no commercially available catalyst technologies that can decompose or reduce $N_2O$ at these low temperatures under a lean (oxidizing) environment. There is a continuing need in the art to provide catalytic articles that efficiently and effectively provide removal of $N_2O$, particularly under exhaust gas conditions, and especially to identify $N_2O$ reduction technologies that are effective under low temperature, lean environments.

SUMMARY OF THE INVENTION

The present disclosure generally provides catalytic compositions, articles, systems and methods for removal of nitrous oxide ($N_2O$), e.g., from exhaust gas streams. Theoretically, at least partial removal of $N_2O$ can be achieved by minimizing the formation of $N_2O$ or by using a catalyst to decompose $N_2O$ (e.g., by converting $N_2O$ to $N_2$ and $O_2$ and/or by converting $N_2O$ to $N_2$ and $H_2O$ and/or $CO_2$ (depending on the reductant)). Effective $N_2O$ decomposition catalytic articles can be provided as stand-alone components or can be incorporated into existing catalyst systems.

An example of an effective $N_2O$ decomposition catalyst comprising a rhodium (Rh) component supported on a ceria-based support is provided in WO2016/094399. Such catalytic materials are ineffective in decomposing $N_2O$ under low temperature conditions (i.e., below 350° C.), particularly in a lean environment. Surprisingly, it has been found that pre-conditioning such catalytic materials with a reducing gas provides a catalytic composition which decomposes $N_2O$ at temperatures below 350° C. and, in some cases, even below 250° C. Further, such pre-conditioned catalytic compositions can effectively reduce $N_2O$ at low temperatures even in a lean environment.

Accordingly, in a first aspect is provided a nitrous oxide ($N_2O$) removal catalyst composition for treating an exhaust stream of an internal combustion engine. The $N_2O$ removal catalyst composition comprises a platinum group metal (PGM) component supported on a metal oxide-based support. The $N_2O$ removal catalyst composition is in a substantially reduced form such that it has an oxygen deficiency of about 0.05 mmol oxygen atoms/g or greater, and provides effective $N_2O$ removal under lean conditions at a temperature of about 350° C. or lower. In one embodiment, the $N_2O$ removal catalyst composition provides effective $N_2O$ removal at a temperature that is about 350° C. to about 150° C. In one embodiment, the $N_2O$ removal catalyst composition provides effective $N_2O$ removal at a temperature that is below about 300° C. In one embodiment, the $N_2O$ removal catalyst composition provides effective $N_2O$ removal at a temperature that is below about 250° C.

In some embodiments, the metal oxide-based support is a high surface area refractory metal oxide. In some embodiments, the metal oxide-based support is selected from the group consisting of alumina, zirconia, silica, titania, ceria, lanthana, baria, praseodymia, yttria, samaria, gadolinia and combinations thereof. In some embodiments, the metal oxide-based support is a reducible metal oxide comprising ceria or ceria in combination with one or more of zirconia, alumina, silica, titania, lanthana, baria, praseodymia, yttria, samaria, and gadolinia. In some embodiments, the metal oxide-based support comprises $CeO_2$ in an amount from about 56 to 100% by weight of the support on an oxide basis. In one embodiment, the metal oxide-based support is pure ceria ($CeO_2$) (i.e., the metal oxide-based support comprises $CeO_2$ in an amount of 100% by weight of the support on an oxide basis). In some embodiments, the metal oxide-based support has a fresh surface area of about 40 to about 200 $m^2/g$.

In some embodiments, the platinum group metal component is present on the support in an amount of about 0.01 to about 5% by weight of the support. In some embodiments, the platinum group metal component is present on the support in an amount of about 0.04 to about 3% by weight of the support. In some embodiments, the platinum group metal component is present on the support in an amount of about 1 to about 2% by weight of the support. In some embodiments, the platinum group component comprises rhodium or rhodium oxide. In some embodiments, the platinum group component is selected from the group consisting of rhodium, rhodium oxide, platinum, platinum oxide, palladium, palladium oxide, ruthenium, ruthenium oxide, and combinations thereof.

In certain embodiments, the nitrous oxide ($N_2O$) removal catalyst composition comprises an optional second component, the second component comprising a base metal or an oxide thereof, or a second platinum group metal, or an oxide thereof. In some embodiments, the second component is a base metal or an oxide thereof. In some embodiments, the base metal or oxide thereof is copper, silver, a copper oxide or a silver oxide. In some embodiments, the second component is a second platinum group metal or an oxide thereof. In some embodiments, the second platinum group metal or oxide thereof is gold, platinum or a platinum oxide. In some embodiments, the base metal or an oxide thereof, or second platinum group metal or oxide thereof, is present on the support in an amount of about 0.02% to about 0.2% by weight of the support. In one embodiment, the $N_2O$ removal catalyst composition comprises a mixture of rhodium and/or rhodium oxide and platinum and/or platinum oxide. In one embodiment, the $N_2O$ removal catalyst composition comprises a mixture of rhodium and/or rhodium oxide in an amount of about 1 to about 2% by weight of the support, and platinum and/or platinum oxide in an amount of about 0.02 to about 0.2% by weight of the support. In one embodiment, the $N_2O$ removal catalyst composition comprises a mixture of rhodium and/or rhodium oxide in an amount of about 2% by weight of the support, and platinum and/or platinum oxide in an amount of about 0.2% by weight of the support.

In some embodiments, the composition is in a substantially reduced form such that it has an oxygen deficiency of about 0.05 mmol oxygen atoms/g or greater. This oxygen deficiency is achieved by exposure to a reductant (e.g., hydrogen, carbon monoxide, hydrocarbons, ammonia, or mixtures thereof). In some embodiments, the substantially reduced form has an oxygen deficiency of about 0.05 mmol to about 0.30 mmol of oxygen atoms per gram of catalyst composition. In some embodiments, the substantially reduced form has an oxygen storage capacity of about 0.20 mmol to about 0.30 mmol of oxygen atoms per gram of catalyst composition.

In some embodiments, 0.2 g of the composition provides removal of about 98% of the $N_2O$ present in a lean feed for a period of about 3 minutes following a 15 second rich feed, wherein the lean feed consists of 200 ppm $N_2O$, 5% $CO_2$, and 5% $H_2O$ in $N_2$, at a total gas flow rate of 50 L/h, and wherein the rich feed consists of 200 ppm $N_2O$, 1% $H_2$, 5% $CO_2$, and 5% $H_2O$ in $N_2$, at a total gas flow rate of 50 L/h. In some embodiments, 0.2 g of the composition provides removal of from about 95% to about 98% of the $N_2O$ present in a lean feed for a period of at least about 5 minutes following an 1 minute rich feed, wherein the lean feed consists of 200 ppm $N_2O$, 5% $CO_2$, and 5% $H_2O$ in $N_2$, at a total gas flow rate of 50 L/h, and wherein the rich feed consists of 200 ppm $N_2O$, 0.75% CO, 0.25% $H_2$, 5% $CO_2$, and 5% $H_2O$ in $N_2$, at a total gas flow rate of 50 L/h.

In another aspect is provided a catalytic article comprising the $N_2O$ removal catalyst composition as disclosed herein, and further comprising a substrate upon which the $N_2O$ removal catalyst composition is deposited. In some embodiments, the substrate comprises a ceramic selected from the group consisting of cordierite, cordierite-alumina, silicon carbide, aluminum titanate, silicon nitride, zircon mullite, spodumene, alumina-silica magnesia, zirconia, sillimanite, a magnesium silicate, zirconium silicate, petalite, alumina, aluminosilicate, and combinations thereof. In some embodiments, the substrate comprises a metal selected from the group consisting of titanium, stainless steel, iron alloy, and combinations thereof. In some embodiments, the substrate form comprises a corrugated sheet, a monolithic substrate, a metallic fiber wall-flow substrate, or a metallic fiber flow-through substrate. In some embodiments, the platinum group metal component is loaded on the substrate in an amount in the range of about 1 to about 105 $g/ft^3$.

In another aspect is provided an emission treatment system for selectively reducing $N_2O$ comprising the disclosed catalytic article, the system further comprising an exhaust conduit in fluid communication with an internal combustion engine via an exhaust manifold and a lean $NO_x$ trap (LNT) comprising a substrate and a LNT catalyst composition, the LNT in fluid communication with the exhaust conduit.

In some embodiments, the $N_2O$ removal catalyst composition is substantially reduced by exposure to a reductant prior to a $deNO_x$ event, such that it has an oxygen deficiency of about 0.05 mmol oxygen atoms/g or greater. In some embodiments, the emission treatment system further comprises a reducing means. In some embodiments, the reducing means is a source of reductant in fluid communication with and upstream of the $N_2O$ removal catalytic article. In some embodiments, the reductant is hydrogen, carbon monoxide, hydrocarbons, ammonia, or mixtures thereof. In certain embodiments, the reductant is hydrogen. In some embodiments, the source of hydrogen is selected from the group consisting of on-board hydrogen storage, hydrogen produced from alcohol reforming, hydrogen produced from ammonia decomposition, hydrogen produced from fuel reforming, and combinations thereof.

In yet another aspect is provided a method for selectively removing at least a portion of $N_2O$ in a gaseous exhaust stream, the method comprising contacting the gaseous exhaust stream with the $N_2O$ removal catalyst composition or article as disclosed herein. In some embodiments, the method further comprises contacting the $N_2O$ removal catalyst composition or article with a reductant prior to a $deNO_x$ event, wherein the catalyst composition exhibits a degree of oxygen deficiency after said contacting that is stoichiometrically equal to or greater than the oxygen generation capacity of $N_2O$ released during the $deNO_x$ event. In some embodiments, the method further comprises contacting the $N_2O$ removal catalyst composition with the reductant for a time period of from about 5 s to about 60 s seconds. In some embodiments, the reductant is selected from the group consisting of hydrogen, carbon monoxide, hydrocarbons, ammonia, and mixtures thereof. In some embodiments, the reductant concentration is from about 1000 ppm to about 10,000 ppm. In some embodiments, the time delay between contacting the $N_2O$ removal catalyst composition with the reductant and the $deNO_x$ event is less than about 2 seconds.

The compositions, articles, systems and methods disclosed herein effectively reduce the $N_2O$ emission from an LNT system, which would be very difficult to accomplish by any other means. An additional advantage of the systems and methods disclosed in certain embodiments is that the on-board reductant disclosed in some embodiments (hydrogen ($H_2$), carbon monoxide (CO), ammonia, or mixtures thereof) can be shared with other low-temperature catalytic systems for reducing other emissions (CO, hydrocarbons (HC) and nitrogen oxides ($NO_x$)) during vehicle cold-start. See, for example, U.S. Provisional Patent Application No. 62/481,406 and International Patent Application No. PCT/IB2017/051299 for such on-board reductant systems, the disclosure of which is incorporated herein by reference.

The present disclosure includes, without limitation, the following embodiments.

Embodiment 1. A nitrous oxide ($N_2O$) removal catalyst composition for treating an exhaust stream of an internal combustion engine, the composition comprising a platinum group metal component supported on a metal oxide-based support, wherein the $N_2O$ removal catalyst composition is in a substantially reduced form such that it has an oxygen deficiency of about 0.05 mmol oxygen atoms/g or greater, and wherein the $N_2O$ removal catalyst composition provides effective $N_2O$ removal under lean conditions at a temperature of about 350° C. or lower.

Embodiment 2. The $N_2O$ removal catalyst composition of the preceding embodiment, wherein the effective $N_2O$ removal is at a temperature that is from about 350° C. to about 150° C.

Embodiment 3. The $N_2O$ removal catalyst composition of any preceding embodiment, wherein the effective $N_2O$ removal is at a temperature that is below about 300° C.

Embodiment 4. The $N_2O$ removal catalyst composition of any preceding embodiment, wherein the effective $N_2O$ removal is at a temperature that is below about 250° C.

Embodiment 5. The $N_2O$ removal catalyst composition of any preceding embodiment, wherein the metal oxide-based support is a high surface area refractory metal oxide.

Embodiment 6. The $N_2O$ removal catalyst composition of any preceding embodiment, wherein the metal oxide-based support is a reducible metal oxide comprising ceria ($CeO_2$) or ceria in combination with one or more of zirconia, alumina, silica, titania, lanthana, baria, praseodymia, yttria, samaria, and gadolinia.

Embodiment 7. The $N_2O$ removal catalyst composition of any preceding embodiment, wherein the metal oxide-based support comprises $CeO_2$ in an amount from about 56% to 100% by weight of the support on an oxide basis.

Embodiment 8. The $N_2O$ removal catalyst composition of any preceding embodiment, wherein the metal oxide-based support comprises $CeO_2$ in an amount of about 100% by weight of the support on an oxide basis.

Embodiment 9. The $N_2O$ removal catalyst composition of any preceding embodiment, wherein the metal oxide-based support has a fresh surface area of about 40 $m^2/g$ to about 200 $m^2/g$.

Embodiment 10. The $N_2O$ removal catalyst composition of any preceding embodiment, wherein the platinum group metal component is present on the support in an amount of about 0.01% to about 5% by weight of the support.

Embodiment 11. The $N_2O$ removal catalyst composition of any preceding embodiment, wherein the platinum group metal component is present on the support in an amount of about 0.04% to about 3% by weight of the support.

Embodiment 12. The $N_2O$ removal catalyst composition of any preceding embodiment, wherein the platinum group metal component is present on the support in an amount of about 1% to about 2% by weight of the support.

Embodiment 13. The $N_2O$ removal catalyst composition of any preceding embodiment, wherein the platinum group metal component comprises rhodium or rhodium oxide.

Embodiment 14. The $N_2O$ removal catalyst composition of any preceding embodiment, wherein the platinum group metal component is selected from the group consisting of rhodium, rhodium oxide, platinum, platinum oxide, palladium, palladium oxide, ruthenium, ruthenium oxide, iridium and iridium oxide.

Embodiment 15. The $N_2O$ removal catalyst composition of any preceding embodiment, wherein the platinum group metal component further comprises a base metal or a second platinum group metal.

Embodiment 16. The $N_2O$ removal catalyst composition of any preceding embodiment, wherein the base metal or second platinum group metal is present on the support in an amount of about 0.02% to about 0.2% by weight of the support.

Embodiment 17. The $N_2O$ removal catalyst composition of any preceding embodiment, wherein the base metal is copper or silver.

Embodiment 18. The $N_2O$ removal catalyst composition of any preceding embodiment, wherein the second platinum group metal is selected from the group consisting of gold, palladium, and platinum.

Embodiment 19. The $N_2O$ removal catalyst composition of any preceding embodiment, wherein the platinum group metal component comprises a mixture of rhodium and/or rhodium oxide and platinum and/or platinum oxide.

Embodiment 20. The $N_2O$ removal catalyst composition of any preceding embodiment, wherein the rhodium and/or rhodium oxide is present in an amount of about 2% by weight of the support and the platinum and/or platinum oxide is present in an amount of about 0.2% by weight of the support.

Embodiment 21. The $N_2O$ removal catalyst composition of any preceding embodiment, wherein the composition is substantially reduced by exposing the composition to hydrogen, carbon monoxide, hydrocarbons, ammonia, or mixtures thereof.

Embodiment 22. The $N_2O$ removal catalyst composition of any preceding embodiment, wherein the composition possesses an oxygen deficiency of about 0.05 to about 0.30 mmol of oxygen atoms per gram of catalyst composition.

Embodiment 23. The $N_2O$ removal catalyst composition of any preceding embodiment, wherein the composition possesses an oxygen deficiency of about 0.20 to about 0.30 mmol of oxygen atoms per gram of catalyst composition.

Embodiment 24. The $N_2O$ removal catalyst composition of any preceding embodiment, wherein 0.2 g of the composition provides removal of about 98% of the $N_2O$ present in a lean feed for a period of about 3 minutes following a 15 second rich feed, wherein the lean feed consists of 200 ppm $N_2O$, 5% $CO_2$, and 5% $H_2O$ in $N_2$, at a total gas flow rate of 50 L/h, and wherein the rich feed consists of 200 ppm $N_2O$, 1% $H_2$, 5% $CO_2$, and 5% $H_2O$ in $N_2$, at a total gas flow rate of 50 L/h.

Embodiment 25. The $N_2O$ removal catalyst composition of any preceding embodiment, wherein 0.2 g of the composition provides removal of from about 95% to about 98% of the $N_2O$ present in a lean feed for a period of at least about 5 minutes following a 1 minute rich feed, wherein the lean feed consists of 200 ppm $N_2O$, 5% $CO_2$, and 5% $H_2O$ in $N_2$, at a total gas flow rate of 50 L/h, and wherein the rich feed consists of 200 ppm $N_2O$, 0.75% CO, 0.25% $H_2$, 5% $CO_2$, and 5% $H_2O$ in $N_2$, at a total gas flow rate of 50 L/h.

Embodiment 26. A catalytic article comprising the $N_2O$ removal catalyst composition of any preceding embodiment, further comprising a substrate upon which the $N_2O$ removal catalyst composition is deposited.

Embodiment 27. The catalytic article of claim 26, wherein the platinum group metal component is loaded on the substrate in an amount in the range of about 1 $g/ft^3$ to about 105 $g/ft^3$.

Embodiment 28. An emission treatment system for selectively reducing $N_2O$, comprising the catalytic article of any preceding embodiment, the system further comprising an exhaust conduit in fluid communication with an internal combustion engine via an exhaust manifold and a lean $NO_x$ trap (LNT) comprising a substrate and a LNT catalyst composition, the LNT in fluid communication with the exhaust conduit.

Embodiment 29. The emission treatment system of any preceding embodiment, further comprising a reducing means sufficient to provide the $N_2O$ removal catalyst composition with an oxygen deficiency of about 0.05 mmol oxygen atoms/g or greater.

Embodiment 30. The emission treatment system of any preceding embodiment, wherein the reducing means is a source of reductant in fluid communication with and upstream of the $N_2O$ removal catalytic article.

Embodiment 31. The emission treatment system of any preceding embodiment, wherein the reductant is hydrogen, carbon monoxide, hydrocarbons, ammonia, or mixtures thereof.

Embodiment 32. The emission treatment system of any preceding embodiment, wherein the reductant is hydrogen.

Embodiment 33. The emission treatment system of any preceding embodiment, wherein the hydrogen is provided by a source selected from the group consisting of on-board hydrogen storage, hydrogen produced from alcohol reforming, hydrogen produced from ammonia decomposition, hydrogen produced from fuel reforming, and combinations thereof.

Embodiment 34. A method for selectively removing at least a portion of $N_2O$ in a gaseous exhaust stream, the method comprising contacting the gaseous exhaust stream with the $N_2O$ removal catalyst composition of any preceding embodiment.

Embodiment 35. The method of any preceding embodiment, further comprising contacting the $N_2O$ removal catalyst composition with a reductant prior to a $deNO_x$ event, providing the catalyst composition in substantially reduced form.

Embodiment 36. The method of any preceding embodiment, further comprising subjecting the $N_2O$ removal catalyst composition to a $deNO_x$ event wherein $N_2O$ is released, and wherein the oxygen generation capacity of the $N_2O$ released is stoichiometrically equal to or less than the oxygen deficiency of the $N_2O$ removal catalyst composition.

Embodiment 37. The method of any preceding embodiment, wherein the reductant is selected from the group consisting of hydrogen, carbon monoxide, hydrocarbons, ammonia, and mixtures thereof, and wherein said contacting the $N_2O$ removal catalyst composition with said reductant is conducted for a period of about 1 second to about 60 seconds.

Embodiment 38. The method of any preceding embodiment, wherein the reductant concentration is from about 1000 ppm to about 10000 ppm.

Embodiment 39. The method of any preceding embodiment, wherein the time delay between said contacting the $N_2O$ removal catalyst composition with the reductant and the said $deNO_x$ event is less than about 2 seconds.

These and other features, aspects, and advantages of the disclosure will be apparent from a reading of the following detailed description together with the accompanying drawings, which are briefly described below. The invention includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosed invention, in any of its various aspects and embodiments, should be viewed as intended to be combinable unless the context clearly dictates otherwise. Other aspects and advantages of the present invention will become apparent from the following.

BRIEF DESCRIPTION OF THE DRAWINGS

The above and other features of the present disclosure, their nature, and various advantages will become more apparent upon consideration of the following detailed description, taken in conjunction with the accompanying drawings, in which:

FIG. 2 is a flow diagram of an exemplary exhaust emission treatment system for an internal combustion engine including a lean $NO_x$ trap (LNT) and an $N_2O$ catalytic reduction article;

DETAILED DESCRIPTION OF THE INVENTION

Figure 1A:
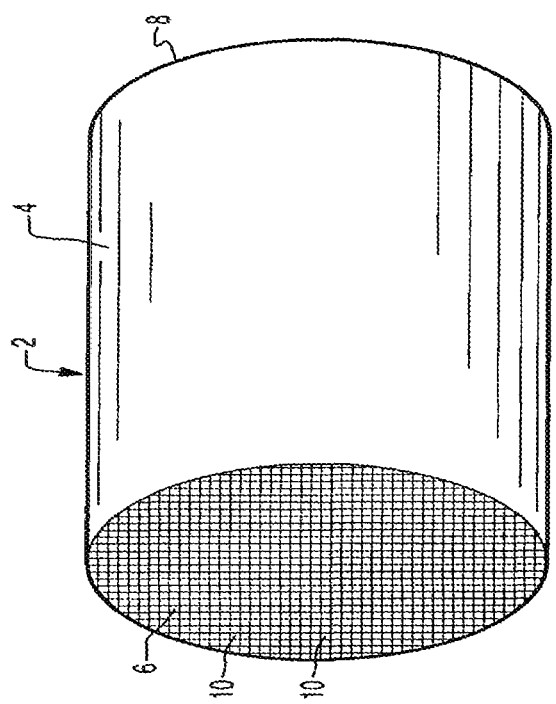
FIG. 1A is a perspective view of a honeycomb-type substrate which may comprise a washcoat composition in accordance with the present invention.

The present disclosure generally provides catalytic compositions, articles, systems and methods for removal of nitrous oxide ($N_2O$), e.g., from exhaust gas streams. The catalytic compositions, articles, and systems of the present disclosure efficiently and effectively decompose $N_2O$ (e.g., by converting $N_2O$ to $N_2$ and $O_2$ and/or by converting $N_2O$ to $N_2$ and $H_2O$ and/or $CO_2$ (depending on the reductant)) under exhaust gas conditions. Surprisingly, the catalytic compositions, articles, and systems disclosed herein are effective in decomposing $N_2O$ at low temperatures in lean environments.

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art.

Definitions

The use of the terms "a," "an," "the," and similar referents in the context of describing the materials and methods discussed herein (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. The term "about" used throughout this specification is used to describe and account for small fluctuations. For example, the term "about" can refer to less than or equal to ±5%, such as less than or equal to ±2%, less than or equal to ±1%, less than or equal to ±0.5%, less than or equal to ±0.2%, less than or equal to ±0.1% or less than or equal to ±0.05%. All numeric values herein are modified by the term "about," whether or not explicitly indicated. A value modified by the term "about" of course includes the specific value. For instance, "about 5.0" must include 5.0.

The term "catalyst" refers to a material that promotes a chemical reaction. The catalyst includes the "catalytically active species" and the "support" that carries or supports the active species. For example, refractory metal oxide particles may be a support for platinum group metal catalytic species.

The term "catalytic article" or "catalyst article" refers to a component that is used to promote a desired reaction. The present catalytic articles comprise a "substrate" having at least one catalytic coating disposed thereon.

The terms "exhaust stream," "engine exhaust stream," "exhaust gas stream" and the like refer to any combination of flowing engine effluent gas that may also contain solid or liquid particulate matter. The stream comprises gaseous components and is, for example, exhaust of a lean burn engine, which may contain certain nongaseous components such as liquid droplets, solid particulates and the like. An exhaust stream of a lean burn engine typically further comprises combustion products, products of incomplete combustion, oxides of nitrogen, combustible and/or carbonaceous particulate matter (soot) and un-reacted oxygen and/or nitrogen. Such terms refer as well as to the effluent downstream of one or more other catalyst system components as described herein.

The term "in fluid communication" is used to refer to articles positioned on the same exhaust line, i.e., a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

A platinum group metal (PGM) component refers to any component that includes a PGM (Ru, Rh, Os, Ir, Pd, Pt and/or Au). For example, the PGM may be in metallic form, with zero valence, or the PGM may be in an oxide form. Reference to "PGM component" allows for the presence of the PGM in any valence state. The terms "platinum (Pt) component," "rhodium (Rh) component," "palladium (Pd) component," "iridium (Ir) component," "ruthenium (Ru) component," and the like refer to the respective platinum group metal compound, complex, or the like which, upon calcination or use of the catalyst, decomposes or otherwise converts to a catalytically active form, usually the metal or the metal oxide.

As used herein, "base metal" refers to a transition metal or lanthanide (e.g., V, Mn, Fe, Co, Ni, Cu, Zn, Ag, Au, or Sn) or oxide thereof that is catalytically active for reduction of $N_2O$, or promotes another catalytic component to be more active for reduction of $N_2O$, and particularly includes copper, silver, iron, manganese, tin, cobalt, nickel, and combinations thereof. For ease of reference herein, concentrations of base metal or base metal oxide materials are reported in terms of elemental metal concentration rather than the oxide form. The total concentration of base metal in the base metal oxide component (e.g., copper, manganese, nickel, cobalt, iron, and combinations thereof) can vary, but will typically be from about 1 wt. % to 50 wt. % relative to the weight of the porous support such as refractory oxide support material (e.g., about 1 wt. % to about 50 wt. % relative to the refractory oxide support).

"Support" in a catalytic material or catalyst washcoat refers to a material that receives metals (e.g., PGMs), stabilizers, promoters, binders, and the like through precipitation, association, dispersion, impregnation, or other suitable methods. Exemplary supports include refractory metal oxide supports as described herein below.

"Refractory metal oxide supports" include bulk alumina, ceria, zirconia, titania, silica, magnesia, neodymia, and other materials known for such use, as well as physical mixtures or chemical combinations thereof, including atomically-doped combinations and including high surface area or activated compounds such as activated alumina. Exemplary combinations of metal oxides include alumina-zirconia, alumina-ceria-zirconia, lanthana-alumina, lanthana-zirconia-alumina, baria-alumina, baria-lanthana-alumina, baria-lanthana-neodymia alumina, and alumina-ceria. Exemplary aluminas include large pore boehmite, gamma-alumina, and delta/theta alumina. Useful commercial aluminas used as starting materials in exemplary processes include activated aluminas, such as high bulk density gamma-alumina, low or medium bulk density large pore gamma-alumina, and low bulk density large pore boehmite and gamma-alumina. Such materials are generally considered as providing durability to the resulting catalyst.

"Reducible metal oxide" refers to a metal oxide which, when subjected to a reducing atmosphere (e.g., hydrogen), contains at least a portion of the metal atoms within the metal oxide in a reduced valence state. For example, cerium in ceria ($CeO_2$; $Ce^{+4}$), when subjected to reducing conditions, may contain a portion of the cerium atoms in the $Ce^{+3}$ valence state.

"High surface area refractory metal oxide supports" refer specifically to support particles having pores larger than 20 Å and a wide pore distribution. High surface area refractory metal oxide supports, e.g., alumina support materials, also referred to as "gamma alumina" or "activated alumina," typically exhibit a BET surface area of fresh material in excess of 60 square meters per gram ("$m^2/g$"), often up to about 200 $m^2/g$ or higher. Such activated alumina is usually a mixture of the gamma and delta phases of alumina, but may also contain substantial amounts of eta, kappa and theta alumina phases.

As used herein, the term "molecular sieves," such as zeolites and other zeolitic framework materials (e.g. isomorphously substituted materials), refers to materials that may, in particulate form, support catalytic PGMs. Molecular sieves are materials based on an extensive three-dimensional network of oxygen ions containing generally tetrahedral type sites and having a substantially uniform pore distribution, with the average pore size being no larger than 20 Angstroms (Å). The pore sizes are defined by the ring size. As used herein, the term "zeolite" refers to a specific example of a molecular sieve, further including silicon and aluminum atoms. Zeolites are crystalline materials having rather uniform pore sizes which, depending upon the type of zeolite and the type and amount of cations included in the zeolite lattice, range from about 3 to 10 Å in diameter.

"Rare earth metal oxides" refer to one or more oxides of scandium, yttrium, and the lanthanum series defined in the Periodic Table of Elements. Rare earth metal oxides can, in some embodiments, be both exemplary oxygen storage components (OSCs) and promoters of oxygen storage. "Promoters" are metals that enhance activity toward a desired chemical reaction or function. Suitable promoters for oxygen storage include one or more rare earth metals selected from the group consisting of lanthanum, cerium, neodymium, gadolinium, yttrium, praseodymium, samarium, and mixtures thereof.

"Alkaline earth metal oxides" refer to Group II metal oxides, which are exemplary "stabilizer materials". Suitable stabilizers include one or more non-reducible metal oxides wherein the metal is selected from the group consisting of barium, calcium, magnesium, strontium and mixtures thereof. Preferably, the stabilizer comprises one or more oxides of barium and/or strontium.

"Washcoat" has its usual meaning in the art of a thin, adherent coating of a material (e.g., a catalyst) applied to a "substrate", such as a honeycomb flow-through monolith substrate or a filter substrate which is sufficiently porous to permit the passage therethrough of the gas stream being treated. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, for example particle size or crystallite phase) and/or may differ in the chemical catalytic functions.

Reference to "monolithic substrate" means a unitary structure that is homogeneous and continuous from inlet to outlet.

Weight percent (wt. %), if not otherwise indicated, is based on an entire composition free of any volatiles; that is, based on solids content. In reference to the platinum group metal component, wt % refers to the metal on a dry basis after calcination.

The term "$NO_x$" refers to nitrogen oxide compounds, such as NO or $NO_2$.

"Selective Catalytic Reduction" (SCR) is the catalytic reduction of nitrogen oxides with a reductant in the presence of an appropriate amount of oxygen with the formation predominantly of nitrogen and water vapor (steam). Reductants may be, for example, hydrocarbon, hydrogen, and/or ammonia. SCR reactions in the presence of ammonia occur according to the following three reactions (Equations 1-3):

$$4NO+4NH_3+O_2 \rightarrow 4N_2+6H_2O \quad \text{(Equation 1)}$$

$$NO+NO_2+2NH_3 \rightarrow 2N_2+3H_2O \quad \text{(Equation 2)}$$

$$6NO_2+8NH_3 \: 43 \: 7N_2+12H_2O \quad \text{(Equation 3)}$$

"TWC" refers to the function of three-way conversion where hydrocarbons, carbon monoxide, and nitrogen oxides are substantially simultaneously converted. A gasoline engine typically operates under near stoichiometric reaction conditions that oscillate or are perturbated slightly between fuel rich and fuel lean air-to-fuel ratios (A/F ratios) (□=1±~0.01). Use of "stoichiometric" herein refers to the conditions of a gasoline engine, accounting for the oscillations or perturbations of A/F ratios near stoichiometric. TWC catalysts include oxygen storage components (OSCs) such as ceria or ceria-zirconia (as referenced below) that have multivalent states which allow oxygen to be held and released under varying air-to-fuel ratios. Under rich conditions when NOx is being reduced, the OSC provides a small amount of oxygen to consume unreacted CO and HC. Likewise, under lean conditions when CO and HC are being oxidized, the OSC reacts with excess oxygen and/or $NO_x$. As a result, even in the presence of an atmosphere that oscillates between fuel rich and fuel lean air-to-fuel ratios, there is conversion of HC, CO, and $NO_x$ all at the same (or at essentially all the same) time. Typically, a TWC catalyst comprises one or more platinum group metals such as palladium and/or rhodium and optionally platinum; an oxygen storage component; and optionally promoters and/or stabilizers. Under rich conditions, TWC catalysts can generate ammonia.

"OSC" refers to an oxygen storage component, which is an entity that has multivalent oxidation states and can actively react with oxidants such as oxygen ($O_2$) or nitrogen oxides ($NO_x$) under oxidative conditions, or reacts with reductants such as carbon monoxide (CO), hydrocarbons (HC), or hydrogen ($H_2$) under reduction conditions. Examples of suitable oxygen storage components include ceria. Praseodymia can also be included as an OSC. Delivery of an OSC to a washcoat layer can be achieved by the use of, for example, mixed oxides. For example, ceria can be delivered as a mixed oxide of cerium and zirconium, and/or a mixed oxide of cerium, zirconium, and neodymium. For example, praseodymia can be delivered as a mixed oxide of praseodymium and zirconium, and/or a mixed oxide of praseodymium, cerium, lanthanum, yttrium, zirconium, and neodymium.

"DOC" refers to a diesel oxidation catalyst, which converts hydrocarbons and carbon monoxide in the exhaust gas of a diesel engine. Typically, a DOC comprises one or more platinum group metals such as palladium and/or platinum; a support material such as alumina; zeolites for HC storage; and optionally promoters and/or stabilizers.

"LNT" refers to a lean $NO_x$ trap, which is a catalyst containing a platinum group metal, ceria, and an alkaline earth trap material suitable to adsorb $NO_x$ during lean conditions (for example, BaO or MgO). Under rich conditions, $NO_x$ is released and reduced to nitrogen.

"CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, A CSF may carry oxidation catalysts to oxidize CO and HC to $CO_2$ and $H_2O$, or oxidize NO to $NO_2$ to accelerate the downstream SCR catalysis or to facilitate the oxidation of soot particles at lower temperatures. A CSF, when positioned behind a LNT catalyst, can have a $H_2S$ oxidation functionality to suppress $H_2S$ emission during the LNT desulfation process. An SCR catalyst can also coated directly onto a wall-flow filter, which is called SCRoF.

"GDI" refers to a gasoline direct injection gasoline engine, which operates under lean burn conditions.

"$AMO_x$" refers to a selective ammonia oxidation catalyst, which is a catalyst containing one or more metals (typically Pt, although not limited thereto) and an SCR catalyst suitable to convert ammonia to nitrogen.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods.

All U.S. patent applications, published patent applications and patents referred to herein are hereby incorporated by reference.

I. Catalyst Compositions

In one aspect is provided a nitrous oxide ($N_2O$) removal catalyst composition for treating an exhaust stream of an internal combustion engine. The $N_2O$ removal catalyst composition comprises a platinum group metal (PGM) component supported on a metal oxide-based support. The $N_2O$ removal catalyst composition is in a substantially reduced form such that it has an oxygen deficiency of at least about 0.05 mmol oxygen atoms/g and provides effective $N_2O$ removal under lean conditions at a temperature of about 350° C. or lower.

As noted above, the $N_2O$ removal catalyst compositions generally disclosed herein comprise a PGM component on a metal oxide-based support (e.g., impregnated on a metal oxide-based support). By "metal oxide-based support" is meant a material (e.g., a refractory metal oxide support material) comprising at least about 50% by weight of metal oxide. As referenced herein above, selection of the (fresh) metal oxide-based support upon which the PGM component is impregnated may affect the activity of the catalyst compositions produced according to the present disclosure. Although not intending to be limited by theory, it is believed that certain metal oxide-based supports, such as ceria, are particularly effective at absorbing $N_2O$. It is generally understood that catalytic decomposition of $N_2O$ consists of the following steps (Equations 4 to 7), where is a catalytically active site:

$$N_2O+\text{—}\rightarrow N_2O\text{—} \quad \text{(Equation 4)}$$

$$N_2O\text{—}\rightarrow N_2 \pm O\text{—} \quad \text{(Equation 5)}$$

$$2O\text{—}\rightarrow O_2+2\text{—} \quad \text{(Equation 6)}$$

$$N_2O+O\text{—}\rightarrow N_2+O_2+\text{—} \quad \text{(Equation 7)}$$

An $N_2O$ molecule contacts an active site and adsorbs thereon (Equation 4). The adsorbed $N_2O$ is then dissociated to $N_2$ and an adsorbed O atom (Equation 5). Two adsorbed O atoms can combine to form an $O_2$ molecule, restoring the open active sites (Equation 6). Alternatively, a $N_2O$ molecule can react with an adsorbed O atom, producing $O_2$ and $N_2$ (Equation 7). On a reduced metal surface, the reaction of Equation 6 can readily take place at room temperature. However, the $O_2$ formation step (Equation 6) is more difficult because of strong O-metal bonding and requires high temperatures (typically >600° C.). As the metal surface is oxidized by the decomposition product (oxygen), the number of reduced metal sites decreases and the decomposition reaction slows down and eventually stops. Therefore, the rate determining step for a metal catalyst is usually the oxygen formation step. Under oxidizing conditions, most metals are not stable and convert to metal oxides. On an oxide catalyst, the $N_2O$ decomposition step (Equation 6) also becomes critical. Although not intending to be limited by theory, it is believed that the activity of certain PGM/metal oxide-based catalysts (e.g., $Rh/CeO_2$) may be attributed to their ability to decompose $N_2O$ and to form $O_2$. The active state of Rh under oxidizing conditions is Rh oxide as detected by X-ray photoelectron spectroscopy. It is speculated that the O atoms, formed as result of $N_2O$ decomposition, can be channeled away from the Rh sites to the support, where they combine to form $O_2$. The special capability of ceria in promoting oxygen mobility is believed to be a key factor for sustained $N_2O$ decomposition activity.

Without being bound by theory, it is noted that certain supports (i.e., ceria) are also reducible, the PGM catalyzing the reduction and enabling it to occur at lower temperatures than it would occur in the absence of a PGM.

In some embodiments, the metal oxide-based support is a high surface area refractory metal oxide. In some embodiments, the metal oxide-based support is reducible. In some embodiments, the metal oxide-based support is selected from the group consisting of alumina, zirconia, silica, titania, ceria, lanthana, baria, praseodymia, yttria, samaria, gadolinia and combinations thereof. In some embodiments, the metal oxide-based support comprises ceria in combination with one or more of alumina, zirconia, silica, titania, lanthana, baria, praseodymia, yttria, samaria, and gadolinia. In some embodiments, the metal oxide-based support is ceria. In some embodiments, the metal oxide based support is ceria in an amount in the range of about 56 to about 100% by weight of the support on an oxide basis. In certain embodiments, the ceria-based support comprises at least about 55 wt. %, at least about 60 wt. %, at least about 65 wt. %, at least about 70 wt. %, at least about 75 wt. %, at least about 80 wt. %, at least about 85 wt. %, at least about 90 wt. %, at least about 91 wt. %, at least about 92 wt. %, at least about 92 wt. %, at least about 93 wt. %, at least about 94 wt. %, at least about 95 wt. %, at least about 96 wt. %, at least about 97 wt. %, at least about 98 wt. %, at least about 99 wt. %, or even at least about 99.9 wt. % ceria (based on the entire weight of the ceria-based support). In some embodiments, the metal oxide based support is ceria in an amount of 100% by weight of the support on an oxide basis. In some embodiments, the ceria-based support may comprise, in addition to ceria, various metal oxides (resulting in a mixed metal oxide composite support). Exemplary metal oxides that may be included in the ceria-based support include zirconia, silica, lanthana, yttria, praseodymia, neodymia, samaria, gadolinia, or other rare earth metal oxides.

Advantageously, in certain embodiments, the metal oxide-based support is at least about 90% by weight ceria or at least about 95% by weight ceria, and in some embodiments, about 100% by weight ceria. The metal oxide-based support may, in some embodiments, comprise about 90 wt. % to about 100 wt. % ceria. In some embodiments, the metal oxide-based support can be described as consisting of ceria or consisting essentially of ceria. The metal oxide-based support can, in some embodiments, be described as being substantially free of other metal oxides. Metal oxide-based supports, and in particular embodiments, metal oxide-based supports comprising ceria in the amounts referenced above, can, in some embodiments, be described as being highly stable. By "highly stable" in this context is meant that the decrease in BET surface area is less than about 60% and the decrease in pore volume is less than about 10% after the material is calcined at 750° C. for 20 hours with 10% water/steam in air.

The metal oxide-based support may comprise a fresh surface area that is in the range of about 40 to about 200 $m^2/g$. The metal oxide-based support may comprise a surface area that is in the range of about 20 to about 140 $m^2/g$ after aging at 750° C. for 20 hours with 10 wt. % water in air. The metal oxide-based support may have an average crystallite size in the range of about 3 to about 20 nm measured by x-ray diffraction (XRD). The metal oxide-based support may comprise an X-ray diffraction crystallite size ratio of aged material to fresh material of about 2.5 or less, where aging is 750° C. for 20 hours with 10% $H_2O$ in air. In some embodiments, the metal oxide based support can exhibit one or more than one (including all) of the characteristics referenced in this and the preceding paragraphs.

Pore volumes of certain preferred fresh metal oxide-based supports are at least about 0.20 $cm^3/g$. In certain embodiments, the pore volume of the fresh metal oxide-based supports is in the range of about 0.20 to 0.40 $cm^3/g$. Surface areas of other preferred fresh metal oxide-based supports are at least about 40 $m^2/g$ and in some embodiments, may be at least about 60 $m^2/g$, at least about 80 $m^2/g$, or at least about 100 $m^2/g$. In certain embodiments, surface areas of the fresh ceria-based supports are in the range of about 40 to about 200 $m^2/g$, and in some embodiments, in the range of about 100 to about 180 $m^2/g$.

In one embodiment, the PGM component is elemental rhodium or rhodium oxide. In other embodiments, the PGM component is platinum, palladium or ruthenium and/or their respective oxides. The PGM component may further comprise an optional second metal component, either a base metal or another platinum group metal. The second metal component may comprise platinum (Pt), palladium (Pd), silver (Ag), gold (Au), copper (Cu), or combinations thereof, as well as their oxides. In some embodiments, the PGM component comprises a mixture of rhodium and/or rhodium oxide and any of copper, silver, iridium, gold, palladium, or platinum and/or their respective oxides. In one embodiment, the PGM component is a mixture of rhodium and platinum. Surprisingly, it has further been discovered that under certain conditions, a catalyst composition lacking the PGM component and comprising a base metal may also demonstrate effective removal of at least a portion of the nitrous oxide ($N_2O$) from an exhaust stream of an internal combustion engine. In preferred embodiments, the base metal component is copper or an oxide thereof.

The PGM component may be present on the metal oxide-based support in an amount in the range of about 0.01 to about 5% or about 0.04 to about 3% by weight on a metal basis. In some embodiments, the PGM is present at about 0.5 to about 1.5% by weight (e.g., about 1% by weight). In some embodiments, the second metal component may be present in an amount in the range of about 0.01 to about 0.5% by weight. In some embodiments, the second metal component may be present in an amount in the range of about 0.02 to about 0.2% by weight. In some embodiments, the PGM component comprises about 1% rhodium and about 0.2% platinum by weight on the metal oxide-based support.

In some embodiments, the PGM component has an average crystallite size of about 3 nm to about 20 nm. In some embodiments, the PGM component has an average crystallite size of about 3 nm to about 5 nm.

The $N_2O$ removal catalyst composition as disclosed herein is provided in a substantially reduced form such that it has an oxygen deficiency of about 0.05 mmol oxygen atoms/g or greater. Methods for obtaining the substantially reduced form of the catalyst composition will be disclosed more fully herein. The degree of oxygen deficiency of the catalyst composition is in the range of about 0.025 mmol to about 2.5 mmol of oxygen atoms/g catalyst composition, as measured by redox cycles at about 200-400° C. using carbon monoxide (CO), hydrogen ($H_2$), or a mixture of the two as the reducing agent and oxygen ($O_2$) or $N_2O$ as the oxidizing agent. In some embodiments, a substantially reduced form is characterized in that the average valence state of PGM within the composition is less than $^+3$, and the support has a certain degree of oxygen deficiency. In some embodiments, the substantially reduced form has an oxygen deficiency of about 0.05 to about 0.3 mmol of oxygen atoms per gram of catalyst composition. In some embodiments, the $N_2O$ removal catalyst composition possesses an oxygen deficiency of about 0.25 mmol of oxygen atoms per gram of catalyst composition.

As used herein, oxygen deficiency is used interchangeably with oxygen storage capacity, as both terms describe the same concept. Methods of measuring the oxygen deficiency (or oxygen storage capacity) of the $N_2O$ removal catalyst composition of the present disclosure are known. See, for example, the 3-step procedure described by Duprez, Daniel and Descorme, Claude (in Catalysis by Ceria and Related Material, ed. A. Trovarelli, Catalysis Sc. Series, Vol. 2, Imperial College Press, p 245), which is incorporated herein by reference. The OSC is usually measured at temperatures relevant to the intended application. At lower temperatures, the measurement can be limited by the redox kinetics. The OSC is typically measured in mmol/g or ☐mol/g on a powder material or mmol/L for a monolith catalyst. Oxygen storage capacity is typically measured under oxygen-reduction conditions. Briefly, an oxidized OSC-containing material is reduced by a reductant, e.g., CO or $H_2$ in an $O_2$-free stream. The OSC is calculated based on the consumption of the reductant. The capacity can also be measured based on the oxygen consumption upon re-oxidation of the OSC containing material. OSC can be measured for its maximum capacity under a set of predefined conditions with a long reduction/oxidation duration or for the dynamic storage capacity with short reductant (CO or $H_2$) pulsations. Dynamic OSC also reflects the kinetics of the reduction/oxidation process.

In an alternative and preferred method, oxygen storage capacity of a catalyst composition may be measured by using $N_2O$ decomposition on a reduced catalyst at a temperature of about 250° C. to about 400° C. The detailed procedures are described herein in Test Protocols A to C. In this instance, $N_2O$ serves as an oxidizer; it decomposes to $N_2$ and an O atom on a reduced catalyst composition. The adsorbed O atoms oxidize the catalyst. By measuring the quantity of $N_2O$ molecules decomposed, one can obtain the oxygen storage capacity of the composition.

Preparation of $N_2O$ Removal Catalyst Compositions

Catalyst compositions comprising a PGM component and a metal oxide-based support according to the present disclosure are commonly provided in the form of a washcoat, and such washcoats may be made by various techniques. The preparation of the catalyst composition generally comprises treating (impregnating) the metal oxide-based support in particulate form with a solution comprising a PGM reagent. For the purposes herein, the term "PGM reagent" means any PGM-containing compound, salt, complex, or the like which, upon calcination or use thereof, decomposes or otherwise converts to the PGM component. In some embodiments, the PGM component is rhodium metal or rhodium oxide. In other embodiments, the PGM component is platinum metal or a platinum oxide, palladium metal or a palladium oxide, or ruthenium metal or a ruthenium oxide. In some embodiments, the PGM component is replaced by a base metal, such as copper.

In general terms, the PGM reagent (e.g., in the form of a solution of a rhodium salt) can be impregnated onto a metal oxide-based support (e.g., as a powder) by, for example, incipient wetness techniques. Water-soluble PGM compounds or salts or water-dispersible compounds or complexes of the metal component may be used as long as the liquid medium used to impregnate or deposit the metal component onto the support particles does not adversely react with the metal or its compound or its complex or other components which may be present in the catalyst composition and is capable of being removed by volatilization or decomposition upon heating and/or application of a vacuum. Generally, both from the point of view of economics and environmental aspects, aqueous solutions of soluble compounds, salts, or complexes of the PGM are advantageously utilized as PGM reagents.

Thereafter, the PGM-impregnated metal oxide-based support is generally calcined. An exemplary calcination process involves heat treatment in air at a temperature of about 400° C. to about 800° C. for about 10 minutes to about 3 hours. During the calcination step and/or during the initial phase of use of the catalytic composition, the PGM reagent is converted into a catalytically active form of the metal or metal oxide thereof. The above process can be repeated as needed to reach the desired level of PGM impregnation. The resulting material can be stored as a dry powder or in slurry form.

The $N_2O$ removal catalyst composition as disclosed herein is provided in a substantially reduced form, such that it has an oxygen deficiency of at least about 0.05 mmol oxygen atoms/g. It is generally understood that the $N_2O$ conversion activity of a catalyst is related to its reducibility, i.e. the ability to accept electrons and, therefore, to lose oxygen. The substantially reduced form may be produced by contacting the catalyst composition with a reductant, typically as a net reducing stream, at a temperature of about 150° C. to about 400° C. In one embodiment, the reductant is a gaseous reductant. In some embodiments, the gaseous reductant is hydrogen, carbon monoxide, hydrocarbons, ammonia, or mixtures thereof. In one embodiment, the gaseous reductant is hydrogen ($H_2$). In another embodiment, carbon monoxide (CO) is the gaseous reductant. In other embodiments, a mixture of $H_2$ and CO is used as the gaseous reductant. The amount of the reductant required to provide the substantially reduced form of the catalyst composition is at least equal to the oxygen storage capacity of the catalyst composition. In practice, an excess amount of reductant is desirable for better reduction efficiency. The duration of exposure to the reductant is dependent on the concentration of the reductant in the stream, and is generally that amount of time sufficient to provide the substantially reduced catalyst composition, such that it has an oxygen deficiency of about 0.05 mmol oxygen atoms/g or greater. Although not limited, typically, the duration of exposure to the reductant stream is about 1 s to about 60 s, and the concentration of the reductant, such as, for example, $H_2$, is about 1000 ppm (0.1%) to about 10,000 ppm (1%).

Catalyst Composition Activity

Catalyst compositions and articles as disclosed herein are effective to decompose at least a portion of the nitrous oxide ($N_2O$) in exhaust gas to nitrogen ($N_2$) and oxygen ($O_2$) and/or to reduce at least a portion of the $N_2O$ therein to $N_2$, $H_2O$, and/or $CO_2$ (depending on the reductant) under conditions of exhaust streams of various types of internal combustion engines. By "at least a portion" is meant some percentage of the total $N_2O$ in the exhaust gas stream is decomposed and/or reduced. For example, in some embodiments, at least about 1%, at least about 2%, at least about 5%, at least about 10%, at least about 20%, at least about 30%, at least about 40%, at least about 50%, at least about 60%, at least about 70%, at least about 80%, or at least about 90% by weight of the nitrous oxide in the gas stream is decomposed and/or reduced under such conditions. For example, under lean conditions, such as those found in exhaust streams of diesel engines operating with a SCR catalyst, a $N_2O$ removal catalyst as described herein can decompose $N_2O$ present in the exhaust stream. By "lean conditions" is meant an exhaust stream comprising oxygen ($O_2$), carbon dioxide ($CO_2$), water vapor, and nitrogen. Under oscillating conditions, such as those found in exhaust streams of diesel and/or gasoline direct injection (GDI) engines operating with an LNT or a TWC, a $N_2O$ removal catalyst as described herein can decompose $N_2O$ present in the exhaust stream. The conversion chemistries occur according to the following reactions (Equations 8-12):

Decomposition:

$$2N_2O \rightarrow 2N_2 + O_2 \quad \text{(Equation 8)}$$

Reduction:

$$N_2O + H_2 \rightarrow N_2 + H_2O \quad \text{(Equation 9)}$$

$$N_2O + HC \rightarrow N_2 + CO_2 + H_2O \quad \text{(Equation 10)}$$

$$N_2O + CO \rightarrow N_2 + CO_2 \quad \text{(Equation 11)}$$

$$3N_2O + 2NH_3 \rightarrow 4N_2 + 3H_2O \quad \text{(Equation 12)}$$

The $N_2O$ removal catalyst compositions disclosed herein are capable of removing varying quantities of $N_2O$ from an exhaust stream. As one example, a 0.2 g quantity of the composition provides removal of about 98% of the $N_2O$ present in a lean feed, maintaining this degree of removal for a period of about 3 minutes, following a 15 second rich feed. The lean feed consisting of 200 ppm $N_2O$, 5% $CO_2$, and 5% $H_2O$ in $N_2$, at a total gas flow rate of 50 L/h and the rich feed consisting of 200 ppm $N_2O$, 1% $H_2$, 5% $CO_2$, and 5% $H_2O$ in $N_2$, at a total gas flow rate of 50 L/h. As another example, a 0.2 g quantity of the composition provides removal of from about 95% to about 98% of the $N_2O$ present in a lean feed for a period of at least about 5 minutes following a 1 minute rich feed, the lean feed consisting of 200 ppm $N_2O$, 5% $CO_2$, and 5% $H_2O$ in $N_2$, at a total gas flow rate of 50 L/h, and the rich feed consisting of 200 ppm $N_2O$, 0.75% CO, 0.25% $H_2$, 5% $CO_2$, and 5% $H_2O$ in $N_2$, at a total gas flow rate of 50 L/h.

II. Catalytic Articles

In another aspect is provided a catalytic article for treating an exhaust stream of an internal combustion engine, the catalytic article comprising the $N_2O$ removal catalyst composition as previously disclosed herein and a substrate upon which the $N_2O$ removal catalyst composition is deposited. Catalytic articles comprising the disclosed catalyst composition advantageously provide the catalyst composition in substantially reduced form, such that it has an oxygen deficiency of at least about 0.05 mmol oxygen atoms/g, by exposure of the catalyst composition of the article to a reductant as previously described.

Substrate

In one or more embodiments, the substrate for the $N_2O$ removal catalytic article disclosed herein may be constructed of any material typically used for preparing automotive catalysts and will typically comprise a metal or ceramic honeycomb structure. The substrate typically provides a plurality of wall surfaces upon which a washcoat comprising the $N_2O$ removal catalyst composition is applied and adhered, thereby acting as a carrier for the catalyst composition. The catalyst composition is typically disposed on a substrate such as a monolithic substrate for exhaust gas applications.

Any suitable substrate may be employed, such as a monolithic substrate of the type having fine, parallel gas flow passages extending therethrough from an inlet or an outlet face of the substrate, such that passages are open to fluid flow therethrough (referred to as honeycomb flow through substrates). The passages, which are essentially straight paths from their fluid inlet to their fluid outlet, are defined by walls on which the catalytic material is coated as a washcoat so that the gases flowing through the passages contact the catalytic material. The flow passages of the monolithic substrate are thin-walled channels, which can be of any suitable cross-sectional shape and size such as trapezoidal, rectangular, square, sinusoidal, hexagonal, oval, circular, etc. Such structures may contain from about 60 to about 900 or more gas inlet openings (i.e., cells) per square inch of cross section. Such monolithic carriers may contain up to about 1200 or more flow passages (or "cells") per square inch of cross section, although far fewer may be used. Flow-through substrates typically have a wall thickness between 0.002 and 0.1 inches.

The substrate can also be a wall-flow filter substrate, where the channels are alternately blocked, allowing a gaseous stream entering the channels from one direction (inlet direction), to flow through the channel walls and exit from the channels from the other direction (outlet direction). The wall-flow filter substrate can be made from materials commonly known in the art, such as cordierite, aluminum titanate or silicon carbide.

Figure 1B:
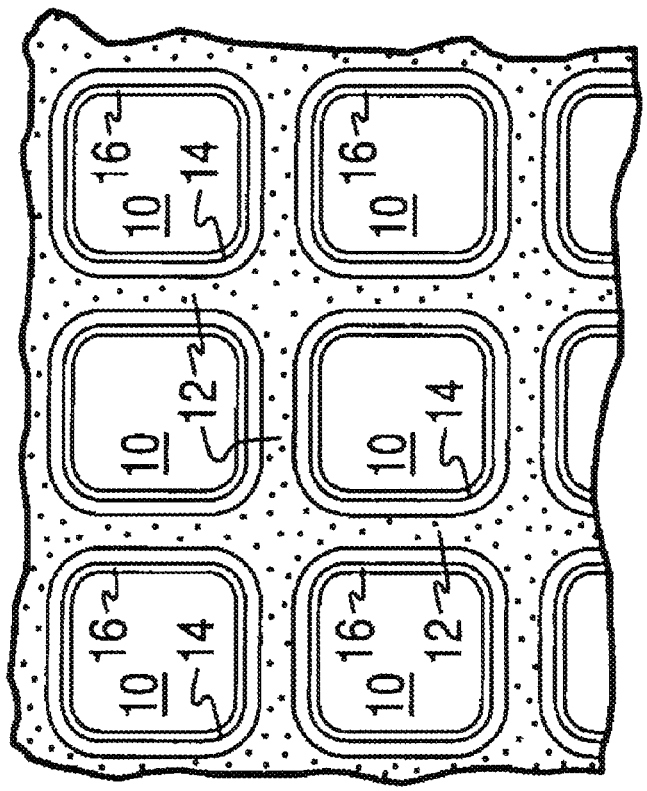
FIG. 1B is a partial cross-sectional view enlarged relative to FIG. 1A and taken along a plane parallel to the end faces of the carrier of FIG. 1A, which shows an enlarged view of a plurality of the gas flow passages shown in FIG. 1A.

The substrate employed according to certain embodiments of the present invention may be more readily appreciated by reference to FIGS. 1A and 1B, which are merely exemplary in nature, and which are in no way intended to limit the invention or its application or uses. FIGS. 1A and 1B illustrate an exemplary substrate 2 in the form of a flow-through substrate coated with the $N_2O$ removal catalyst composition as described herein. Referring to FIG. 1A, the exemplary substrate 2 has a cylindrical shape and a cylindrical outer surface 4, an upstream end face 6 and a corresponding downstream end face 8, which is identical to end face 6. Substrate 2 has a plurality of fine, parallel gas flow passages 10 formed therein. As seen in FIG. 1B, flow passages 10 are formed by walls 12 and extend through carrier 2 from upstream end face 6 to downstream end face 8, the passages 10 being unobstructed so as to permit the flow of a fluid, e.g., a gas stream, longitudinally through carrier 2 via gas flow passages 10 thereof. As more easily seen in FIG. 1B, walls 12 are so dimensioned and configured that gas flow passages 10 have a substantially regular polygonal shape. As shown, the $N_2O$ removal catalyst composition can be applied in multiple, distinct layers if desired. In the illustrated embodiment, the $N_2O$ removal catalyst composition consists of both a discrete bottom layer 14 adhered to the walls 12 of the carrier member and a second discrete top layer 16 coated over the bottom layer 14. Each layer of the $N_2O$ removal catalyst composition may be applied as, for example, a washcoat. The present invention can be practiced with one or more (e.g., 2, 3, or 4) layers and is not limited to the two-layer embodiment illustrated in FIG. 1B.

The substrate may be made of any suitable refractory material, e.g., cordierite, cordierite-alumina, silicon carbide, aluminum titanate, zircon mullite, spodumene, alumina-silica magnesia, zircon silicate, sillimanite, a magnesium silicate, zircon, petalite, alumina, an aluminosilicate and the like, or combinations thereof.

The substrates useful for the catalytic article of the present invention may also be metallic in nature and be composed of one or more metals or metal alloys. The metallic substrates may be employed in various shapes such as corrugated sheet or monolithic form. Preferred metallic supports include the heat resistant metals and metal alloys such as titanium and stainless steel as well as other alloys in which iron is a substantial or major component. Such alloys may contain one or more of nickel, chromium and/or aluminum, and the total amount of these metals may advantageously comprise at least 15 wt. % of the alloy, e.g., 10-25 wt. % of chromium, 3-8 wt. % of aluminum and up to 20 wt. % of nickel. The alloys may also contain small or trace amounts of one or more other metals such as manganese, copper, vanadium, titanium and the like. The surface of the metal substrates may be oxidized at high temperatures, e.g., 1000° C. and higher, to improve the resistance to corrosion of the alloys by forming an oxide layer on the surfaces of the substrates/carriers. Such high temperature-induced oxidation may enhance the adherence of the refractory metal oxide support and catalytically promoting metal components to the substrate. In some embodiments, the substrate is a flow through or wall-flow filter comprising metallic fibers.

In alternative embodiments, one or more catalyst compositions may be deposited on an open cell foam substrate. Such substrates are well known in the art, and are typically formed of refractory ceramic or metallic materials.

Coating the Substrate

The $N_2O$ removal catalyst composition as disclosed above is slurried in deionized water to form a washcoat for purposes of coating a catalyst substrate, such as the types of substrate described herein above. Additional process steps may be applied to either the impregnated powder or the slurry prior to coating the washcoat onto a substrate. In addition to the catalyst composition, the slurry may optionally contain alumina as a binder, hydrocarbon (HC) storage components (e.g., zeolites), water-soluble or water-dispersible stabilizers (e.g., barium acetate), promoters (e.g., lanthanum nitrate), associative thickeners, and/or surfactants (including anionic, cationic, non-ionic or amphoteric surfactants). In some embodiments, desired additional ingredients such as other platinum group metals can be added to the slurry.

In one or more embodiments, the slurry is acidic, having a pH of about 2 to less than about 7. The pH of the slurry may be lowered by the addition of an adequate amount of an inorganic or an organic acid to the slurry. Combinations of both an inorganic acid and an organic acid can be used in some embodiments, particularly when compatibility of acid and raw materials is considered. Inorganic acids include, but are not limited to, nitric acid. Organic acids include, but are not limited to, acetic acid, propionic acid, oxalic acid, malonic acid, succinic acid, glutamic acid, adipic acid, maleic acid, fumaric acid, phthalic acid, tartaric acid, citric acid and the like and combinations thereof. Thereafter, if desired, water-soluble or water-dispersible compounds of a stabilizer, e.g., barium acetate, and/or a promoter, e.g., lanthanum nitrate, may be added to the slurry.

The slurry can be milled to enhance mixing of the particles and formation of a homogenous material. The milling can be accomplished in a ball mill, continuous mill, or other similar equipment to ensure solids contents, e.g., within the ranges noted below with respect to coating various types of substrates. In some embodiments, the slurry may be comminuted to result in about 90% of the solids having particle sizes of less than a given size, e.g., less than about 20 microns in average diameter, such as about 0.1 to about 15 microns in average diameter (for example, for coating onto a substrate/carrier that is a flow-through monolith). In some embodiments, the slurry may be comminuted to result in substantially all of the solids having particle sizes of less than about 10 microns in average diameter, such as about 2 to about 3 microns in average diameter (for example, for coating onto a substrate/carrier that is a wall flow monolith). The optional comminution may be accomplished in a ball mill or a continuous mill, and the solids content of the slurry may be, e.g., about 10-50 wt. %, more particularly about 10-40 wt. % for coating onto a flow-through monolith and, e.g., about 5-30 wt. %, more particularly about 10-20 wt. % for coating onto a wall flow monolith.

The slurry is then coated on the substrate using a washcoat technique known in the art. In one embodiment, the catalyst substrate is dipped one or more times in the slurry or otherwise coated with the slurry. In some embodiments, the catalyst composition slurry is applied to the substrate such that a desired loading of the washcoat is deposited, e.g., about 0.5 g/in$^3$ to about 3.0 g/in$^3$.

Thereafter, the coated substrate is dried at an elevated temperature (e.g., about 100° C. to about 150° C.) for a period of time (e.g., about 1 to about 3 hours) and then calcined by heating, e.g., at about 400° C. to about 600° C., typically for about 10 minutes to about 3 hours. Following drying and calcining, the final washcoat coating layer can generally be viewed as essentially solvent-free. After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating on the substrate to the desired loading level or thickness. The catalyst composition can be applied as a single layer or in multiple layers to the substrate. In some embodiments, the PGM component may be loaded on the substrate in an amount in the range of about 1 g/ft$^3$ to about 105 g/ft$^3$.

In certain embodiments, the coated substrate is aged, by subjecting the coated substrate to heat treatment. In one particular embodiment, aging is done at 750° C. in an environment of 10 vol. % water in air for 20 hours. Aged catalyst articles are thus provided in certain embodiments. In certain embodiments, particularly effective materials comprise metal oxide-based supports (including, but not limited to substantially 100% ceria supports) that maintain a high percentage (e.g., about 95-100%) of their pore volumes upon aging (e.g., at 750° C., 10 vol. % water in air, 20 hours aging). Accordingly, pore volumes of aged metal oxide-based supports can be, in some embodiments, at least about 0.18 cm$^3$/g, at least about 0.19 cm$^3$/g, or at least about 0.20 cm$^3$/g, e.g., about 0.18 cm$^3$/g to about 0.40 cm$^3$/g. The surface areas of aged metal oxide-based supports (e.g., after aging at the above-noted conditions) can be, for example, within the range of about 20 to about 140 m$^2$/g (e.g., based on aging fresh ceria supports having surface areas of about 40 to about 200 m$^2$/g) or about 50 to about 100 m$^2$/g (e.g., based on aging fresh metal oxide-based supports having surface areas of about 100 to about 180 m$^2$/g). Accordingly, surface areas of preferred aged metal oxide-based supports are in the range of about 50 m$^2$/g to about 100 m$^2$/g after aging at 750° C. for 20 hours with 10 wt. % water in air. In some embodiments, the fresh and aged material can be analyzed by x-ray diffraction, wherein, for example, the average crystallite size ratio of fresh to aged catalyst article can be about 2.5 or less, where aging is at the above-noted conditions.

III. $N_2O$ Removal Catalytic System

In a further aspect, the present invention also provides emission treatment systems that incorporate the $N_2O$ removal catalyst compositions and articles as described herein. The $N_2O$ removal catalyst compositions and articles of the present invention are typically used in an integrated emissions treatment system comprising one or more additional components for the treatment of exhaust gas emissions. $N_2O$ removal catalyst compositions and articles as disclosed herein may be incorporated in various ways within an exhaust gas stream treatment system. The $N_2O$ removal catalyst compositions disclosed herein may be provided, in some embodiments, in the form of a catalytic article comprising the $N_2O$ catalyst composition and substrate, substantially free of other catalytic material. $N_2O$ catalyst compositions and/or articles are generally employed in combination with one or more other components (e.g., other catalysts, as will be described in greater detail below). The $N_2O$ removal catalyst composition and/or article can be positioned upstream or downstream from such other components.

"Downstream" refers to a position of a component in an exhaust gas stream in a path further away from the engine than the preceding component. For example, when a diesel particulate filter is referred to as downstream from a diesel oxidation catalyst, exhaust gas emanating from the engine in an exhaust conduit flows through the diesel oxidation catalyst before flowing through the diesel particulate filter. Thus, "upstream" refers to a component that is located closer to the engine relative to another component. In all flow diagrams referenced herein, the gas flow is understood to be from left to right such that the $N_2O$ removal catalyst composition/article is generally downstream of the other components shown in the illustrated systems. For example, in preferred embodiments, within an exhaust gas stream system, the inventive $N_2O$ removal catalyst composition must be positioned downstream of the lean $NO_x$ trap catalyst (LNT). In one embodiment is provided an emission treatment system for selectively reducing $N_2O$ comprising the catalytic composition or article as disclosed herein, the system further comprising an exhaust conduit in fluid communication with an internal combustion engine via an exhaust manifold and a lean $NO_x$ trap (LNT) comprising a substrate and a LNT catalyst composition associated therewith, with the LNT in fluid communication with the exhaust conduit.

FIG. 2 illustrates an exemplary exhaust emission treatment system for an internal combustion engine in the form of a flow diagram, the system including a lean $NO_x$ trap (LNT) and an $N_2O$ removal catalytic article as described herein. A PGM-containing catalyst composition as disclosed, but in an unreduced state, placed downstream of a LNT catalyst as illustrated in FIG. 2, would not be able to reduce the $N_2O$ emission generated on the LNT catalyst during a $deNO_x$ event because when the $N_2O$ pulse reached the $N_2O$ removal catalyst, the catalyst composition would still be in an oxidized state. The $N_2O$ removal catalyst composition as disclosed herein, in an unreduced state, has a zero $N_2O$ conversion at 300° C. in a lean feed.

Use of a reductant to pre-reduce the $N_2O$ removal catalyst composition (as an activation step) before the $N_2O$ peak reaches the catalytic article will allow removal of the $N_2O$ emission. Therefore, in some embodiments is provided an emission treatment system wherein the $N_2O$ removal catalyst composition is in a substantially reduced form, such that it has an oxygen deficiency of about 0.05 mmol oxygen atoms/g or greater, by exposure to a reductant prior to a $deNO_x$ event. In some embodiments, the system further comprises a reducing means. In some embodiments, the reducing means is a source of reductant in fluid communication with and upstream of the $N_2O$ removal catalytic article. In some embodiments, the reductant is hydrogen, carbon monoxide, hydrocarbons, ammonia, or mixtures thereof. In certain embodiments, the reductant is $H_2$. In some embodiments, the reducing agent is stored on-board. In some embodiments, the reducing agent can be generated directly within the $N_2O$ removal catalytic system or an associated exhaust treatment system. In some embodiments, the reducing agent is generated in an associated exhaust treatment system. In some embodiments, the reducing agent is contained within or associated with the $N_2O$ removal catalytic system. In some embodiments, the reducing agent is $H_2$, and is provided by an $H_2$ generator. The hydrogen generator may vary and may be selected from the group consisting of hydrogen produced from alcohol reforming, hydrogen produced from ammonia decomposition, hydrogen produced from hydrocarbon reforming, and hydrogen produced from water electrolysis.

Generating hydrogen from alcohol reforming may require alcohol storage on board. Suitable alcohols include but are not limited to ethanol and methanol. The alcohol storage may be connected to a reforming catalyst which could catalytically reform the ethanol and/or methanol and/or other suitable alcohol to hydrogen.

Generating hydrogen from ammonia decomposition, in some embodiments, is done via on-board urea storage. On-board urea storage is known and is utilized to inject urea into the exhaust stream right before a SCR catalytic article placement. A single on-board urea storage may be employed for different purposes, including, but not limited to, urea injection into the exhaust stream prior to SCR and urea injection used to decompose ammonia and generate hydrogen in the exhaust stream prior to a $H_2$-SCR catalytic article placement. Such hydrogen generation via the on-board urea storage may be further utilized to supply hydrogen to the $N_2O$ removal catalyst composition according to the present disclosure.

Hydrogen may also be generated from hydrocarbon reforming. The diesel fuel storage may be connected to a reforming catalyst which could catalytically reform hydrocarbons in the diesel fuel to hydrogen. This hydrogen generator may be more challenging than other hydrogen generators described due to the diversity of hydrocarbons in the fuel.

It is to be understood that the present invention encompasses various hydrogen generators and that the above list is exemplary and is not intended to be limiting.

Methods for Treating Exhaust Streams Containing $NO_x$

In another aspect, the present disclosure is directed to a method for treating an exhaust stream containing $NO_x$, comprising passing the exhaust stream through the catalyst compositions, catalytic articles, and/or emission treatment systems disclosed herein. Methods disclosed herein include treating an exhaust gas stream during a $deNO_x$ event, when the exhaust gas temperature is at or below about 350° C. In some embodiments, the catalyst composition comprising a platinum group metal component supported on a metal oxide-based support, which can be in the form of a catalytic article further comprising a substrate, is contacted with a reductant to provide said catalyst composition or article in substantially reduced form, such that it has an oxygen deficiency of about 0.05 mmol oxygen atoms/g or greater, prior to exposure to high levels of $N_2O$, such as in a $deNO_x$ event, as referenced herein above. For example, the catalyst composition or article is contacted with a reductant for a period of time, e.g., so as to create a degree of oxygen deficiency. Normally, it is expected that contacting the catalyst composition with the reductant for a duration of a few seconds will provide the $N_2O$ removal catalyst composition or article in substantially reduced form. In some embodiments, the catalytic composition or article is contacted with the reductant for a duration of from about 5 s to about 60 s preceding a $deNO_x$ event. The duration of contact with the reductant may vary depending on the concentration of reductant and flow rate of reductant. In some embodiments, the $N_2O$ removal catalyst composition is contacted with the reductant for a sufficient time to create a degree of oxygen deficiency in the catalyst composition stoichiometrically equal to or greater than the oxygen generation capacity of the $N_2O$ released in the LNT $deNO_x$ event. The reductant concentration may be varied. In one embodiment, the reductant concentration is between about 1000 ppm and 10000 ppm. One skilled in the art will recognize that the reduction conditions (time, concentration, flow rate) may be varied to optimize performance under a variety of different operating conditions. The time delay between completion of contacting of the catalyst composition or article with the reductant and occurrence of the $deNO_x$ event may also be varied. In some embodiments, the time delay is less than about 2 seconds. In a preferred embodiment, the time delay is about zero seconds.

Present compositions, articles, systems and methods are suitable for treatment of exhaust gas streams from mobile emissions sources (i.e., the internal combustion engine of a motor vehicle). Such compositions, articles, systems and methods are also suitable for treatment of exhaust streams from stationary sources such as power plants.

EXAMPLES

Catalyst Composition Preparation

Table 1 summarizes the catalyst information for compositions 1 to 22. Compositions 1 to 3 are supported Rh catalyst compositions with 1% Rh by weight prepared by the wet impregnation method. A slurry of a metal oxide support material, about 30% solids, was made by adding deionized water to the metal oxide support material as a powder. The slurry pH was subsequently adjusted to pH=4 with $HNO_3$. After a milling step, a rhodium nitrate solution was added to the slurry, and the slurry was then dried under stirring. The resulting powder was calcined at 500° C. for 2 h in air and was further thermally aged at 750° C. for 20 h in an atmosphere of 10% water in air. The $CeO_2$ and $Al_2O_3$ supports are commercially available materials, and the $ZrO_2$—$SiO_2$ material was made in-house according to the procedures described in U.S. Pat. No. 7,850,842, incorporated herein by reference. Compositions 4-15 are $CeO_2$ supported metal catalysts (other than Rh). They were prepared using a similar method to $Rh/CeO_2$ (Composition 1). The metal loading ranged from 1 to 2% by weight. Compositions 16 and 17 were made by co-impregnation of Rh and a secondary metal (Cu or Ag) nitrate solution on $CeO_2$ with the same procedure as for compositions 1 to 3. Compositions 18 to 22 were prepared by impregnating calcined $Rh/CeO_2$ (composition 1) with a second metal precursor solution. All compositions were subsequently aged at 750° C. for 20 hours with 10% steam in air before testing.

TABLE 1

Catalyst composition description for powder samples.

| Comp. # | Rh (wt %) | Metal (wt %) | Catalyst Support | Support BET ($m^2/g$) | Preparation method |
|---|---|---|---|---|---|
| 1 | 1.0 | | $CeO_2$ | $131^a/70^b$ | Rh impregnation |
| 2 | 1.0 | | $Al_2O_3$ | 137/136 | Rh impregnation |
| 3 | 1.0 | | $ZrO_2$—$SiO_2$ | | Rh impregnation |
| 4 | | 1% Pt | $CeO_2$ | 131/76 | Pt impregnation |
| 5 | | 1% Pd | $CeO_2$ | 131/76 | Pd impregnation |
| 6 | | 1% Ru | $CeO_2$ | 131/76 | Ru impregnation |
| 7 | | 1% Ir | $CeO_2$ | 131/76 | Ir impregnation |
| 8 | | 1% Au | $CeO_2$ | 131/76 | Au impregnation |
| 9 | | 1% Ag | $CeO_2$ | 131/76 | Ag impregnation |
| 10 | | 2% Mn | $CeO_2$ | 131/76 | Mn impregnation |
| 11 | | 2% Fe | $CeO_2$ | 131/76 | Fe impregnation |
| 12 | | 2% Cu | $CeO_2$ | 131/76 | Cu impregnation |
| 13 | | 2% Sn | $CeO_2$ | 131/76 | Sn impregnation |
| 14 | | 2% Co | $CeO_2$ | 131/76 | Co impregnation |
| 15 | | 2% Ni | $CeO_2$ | 131/76 | Ni impregnation |
| 16 | 1.0 | 2% Cu | $CeO_2$ | 131/76 | Rh—Cu co-impregnation |
| 17 | 1.0 | 0.2% Ag | $CeO_2$ | 131/76 | Rh—Ag co-impregnation |
| 18 | 1.0 | 0.2% Ir | $CeO_2$ | 95/55 | Ir impreg. on calcined $Rh/CeO_2$ |
| 19 | 1.0 | 0.02% Au | $CeO_2$ | 95/55 | Au impreg. on calcined $Rh/CeO_2$ |
| 20 | 1.0 | 0.02% Pd | $CeO_2$ | 95/55 | Pd impreg. on calcined $Rh/CeO_2$ |
| 21 | 1.0 | 0.2% Pd | $CeO_2$ | 95/55 | Pd impreg. on calcined $Rh/CeO_2$ |
| 22 | 1.0 | 0.2% Pt | $CeO_2$ | 95/55 | Pt impreg. on calcined $Rh/CeO_2$ |

$^a$Fresh BET surface area.
$^b$Aged BET surface area. Aging condition: 750° C./20 h with 10% steam.

Test protocol A (Compositions 1-15).

Compositions 1 to 15 were tested in a high-throughput reactor system with 0.2 g of sample shaped to 250-500 □m. The total gas flow rate was 50 L/h, corresponding to a monolith space velocity of 30,000 $^{-1}$ with 2 $g/in^3$ washcoat loading. The $N_2O$ conversion was measured with an alternating lean/rich feed at 350° C. The lean feed consisted of 200 ppm $N_2O$, 5% $CO_2$, 5% $H_2O$ and balance $N_2$, while the rich feed included 200 ppm $N_2O$, 1% $H_2$, 5% $CO_2$, 5% $H_2O$ and balance $N_2$. The lean/rich cycle was run for 5 times consecutively for each catalyst composition with 3 min lean and 15 s rich.

Test protocol B (Compositions 1-3, 6, 12 and 16-22)

Compositions 1-3, 6, 12 and 16-22 were tested in a high-throughput reactor system with 0.2 g of sample shaped to 250-500 □m. The total gas flow rate was 50 L/h, corresponding to a monolith space velocity of 30,000 $h^{-1}$ with 2 $g/in^3$ washcoat loading. The $N_2O$ conversion was measured with an alternating lean/rich feed at 350° C. The lean feed consisted of 200 ppm $N_2O$, 5% $CO_2$, 5% $H_2O$ and the balance $N_2$, while the rich feed included 200 ppm $N_2O$, 0.75% CO, 0.25% $H_2$, 5% $CO_2$, 5% $H_2O$ and the balance $N_2$. The lean/rich cycle was run 3 times for each catalyst with 20 min lean and 1 min rich.

Test protocol C (Composition 1)

Composition 1 was tested in a high-throughput reactor system with 0.2 g of sample shaped to 250-500 □m. The total gas flow rate was 50 L/h, corresponding to a monolith space velocity of 30,000 $h^{-1}$ with 2 $g/in^3$ washcoat loading. The $N_2O$ conversion was measured with an alternating lean/rich feed at 250, 350 and 400° C. The lean feed consisted of 200 ppm $N_2O$, 5% $CO_2$, 5% $H_2O$ and balance $N_2$, while the rich feed included 200 ppm $N_2O$, 0.75% CO, 0.25% $H_2$, 5% $CO_2$, 5% $H_2O$ and balance $N_2$. The lean/rich cycle was run 3 times for each catalyst with 20 min lean and 5 min rich.

Example 1

Figure 3:
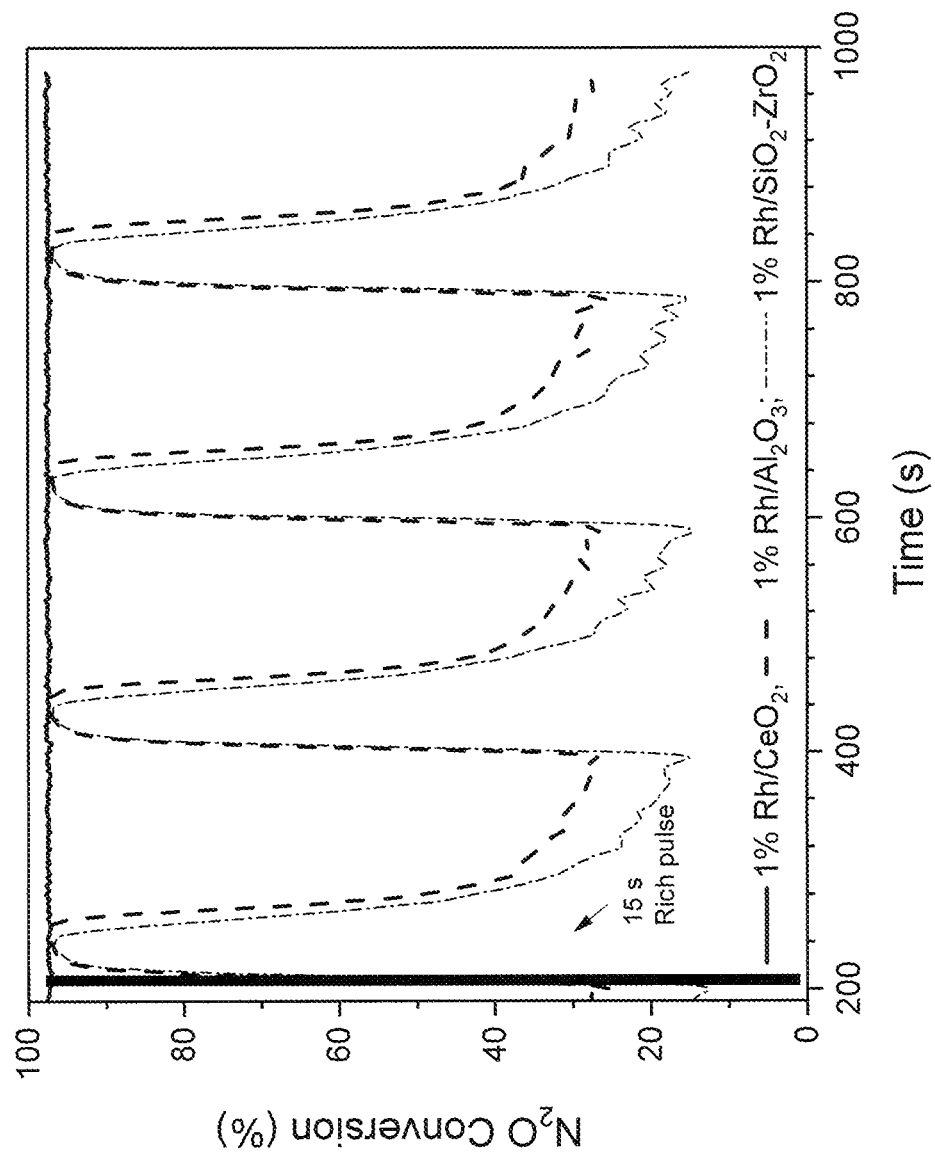
FIG. 3 is a graphical illustration of results for $N_2O$ conversion of Compositions 1-3 as tested using Test Protocol A at 350° C. (as referenced in the Examples section)
Figure 4:
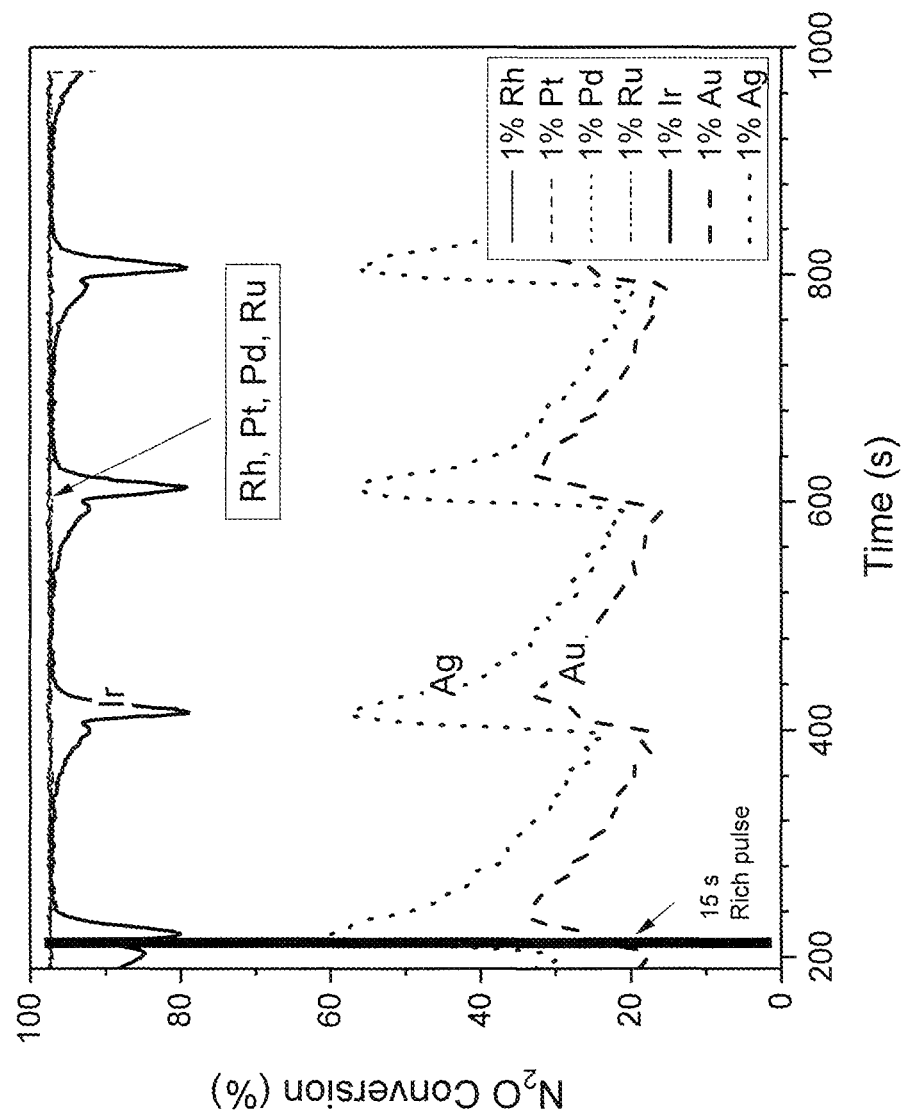
FIG. 4 is a graphical illustration of results for $N_2O$ conversion of Compositions 1 and 4-9 as tested using Test Protocol A at 350° C. (as referenced in the Examples section)
Figure 5:
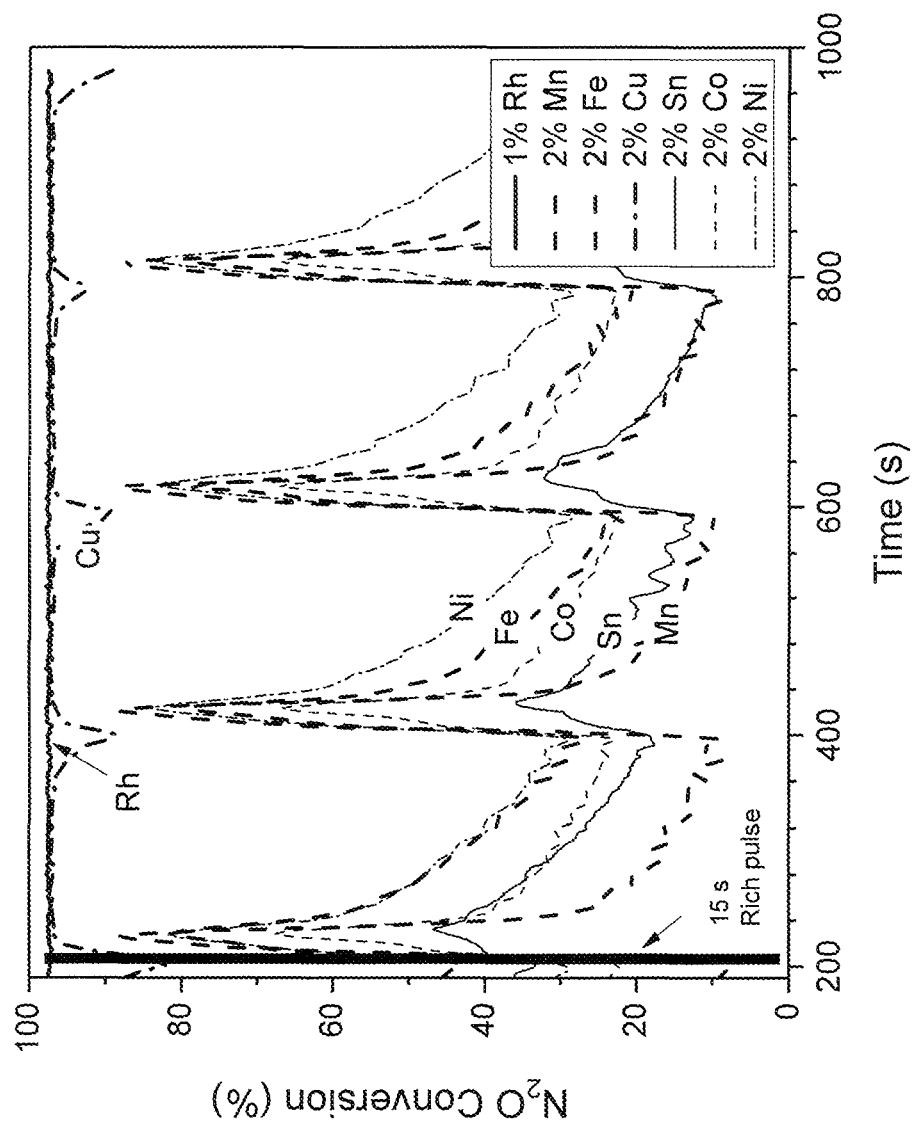
FIG. 5 is a graphical illustration of results for $N_2O$ conversion of Compositions 1 and 10-15 as tested using Test Protocol A at 350° C. (as referenced in the Examples section)

FIGS. 3-5 illustrate the test results using Protocol A at 350° C. FIG. 3 illustrates the effect of support material on $N_2O$ conversion on 1% Rh catalysts. On the 1% Rh/$CeO_2$ catalyst (Composition 1), the $N_2O$ conversion was steady and near 100%. The 15 s reduction (as indicated by the dark line in FIG. 3) allowed the Rh/$CeO_2$ catalyst to completely decompose $N_2O$ for 3 min (the entire lean period). On the other hand, the Rh catalysts supported on $Al_2O_3$ and $SiO_2$—$ZrO_2$ (Compositions 2 and 3) reached full conversion immediately after the reduction pulse, but conversion quickly decreased to 20-30%.

FIG. 4 compares the $N_2O$ decomposition activities of $CeO_2$ supported metal catalysts. Similar to Rh/$CeO_2$ (Composition 1), Pt/$CeO_2$, Pd/$CeO_2$ and Ru/$CeO_2$ (Compositions 4-6) showed a stable, complete $N_2O$ decomposition activity at 350° C. with periodic rich pulses. On Ir/$CeO_2$ catalyst (Composition 7), the $N_2O$ conversion was near 100% after the rich pulse but decreased to about 80% near the end of the 3 min lean period. Au/$CeO_2$ and Ag/$CeO_2$ (Compositions 8, 9) were less effective; their $N_2O$ conversions did not exceeded 60%.

FIG. 5 shows the $N_2O$ decomposition activities of $CeO_2$ supported base metal catalysts. Cu/$CeO_2$ exhibited the best activity for the base metal catalyst compositions, with an activity slightly lower than that of Compositions 1 and 4-6, but higher than that of Composition 7. Other base metal catalyst compositions showed activity decay after the rich pulse, the speed of decay following the order of Ni<Fe<Co<Mn<Sn.

Example 2

Figure 6:
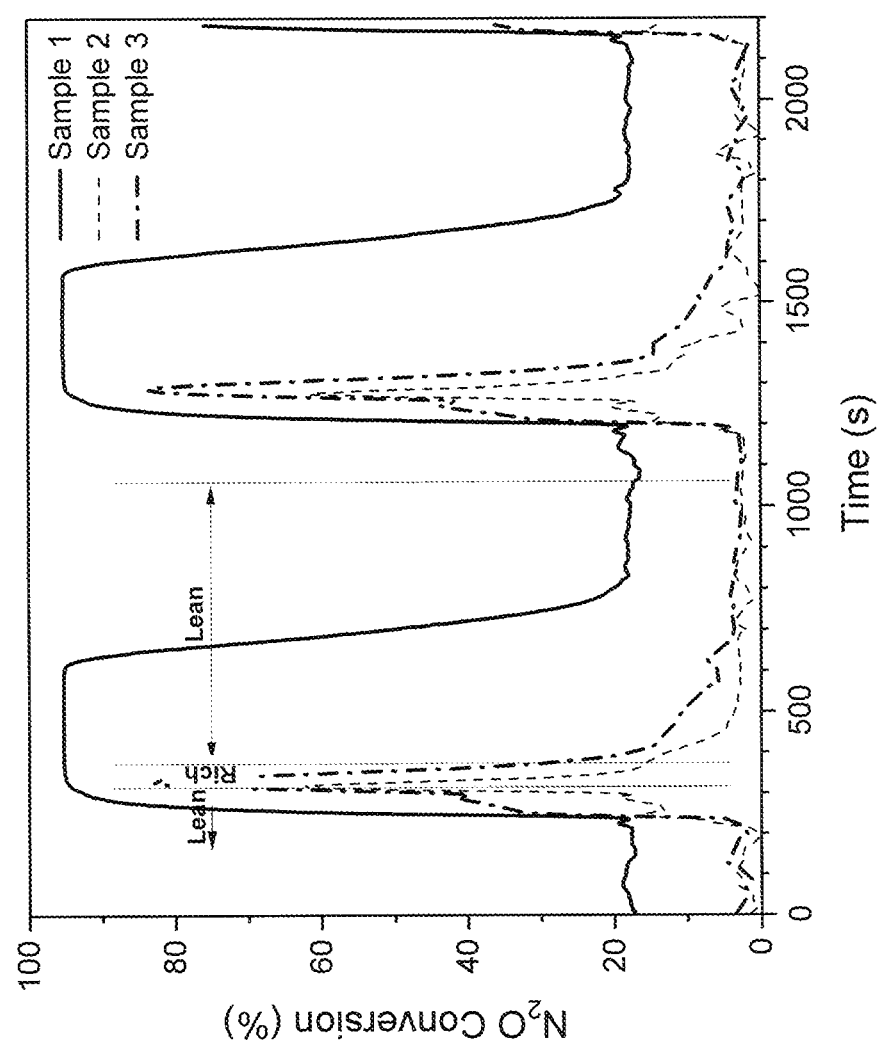
FIG. 6 is a graphical illustration of results for $N_2O$ conversion of Composition 1-3 as tested using Test Protocol B at 350° C. (as referenced in the Examples section)

FIG. 6 shows the effect of support material on $N_2O$ conversion on 1% Rh catalysts (Compositions 1-3) using Protocol B at 350° C. On Composition 1, the stabilized $N_2O$ conversion with a lean feed (before the first reduction pulse) was about 20%. Upon switching to the rich feed (1 min), the conversion quickly increased to 95% at the end of the rich period. After the feed was switched to lean again, the $N_2O$ conversion continued at the same level for about 300 s and then gradually returned to its steady-state lean level (20%). The higher $N_2O$ conversion observed in the lean period is the result of the reduction treatment (1 min). This rich effect was quite different for Compositions 2 and 3. Their stabilized lean $N_2O$ conversions were near zero. During the 1-min rich reduction, the $N_2O$ conversions experienced a momentary surge but quickly dropped back to their original states.

Example 3

Figure 7:
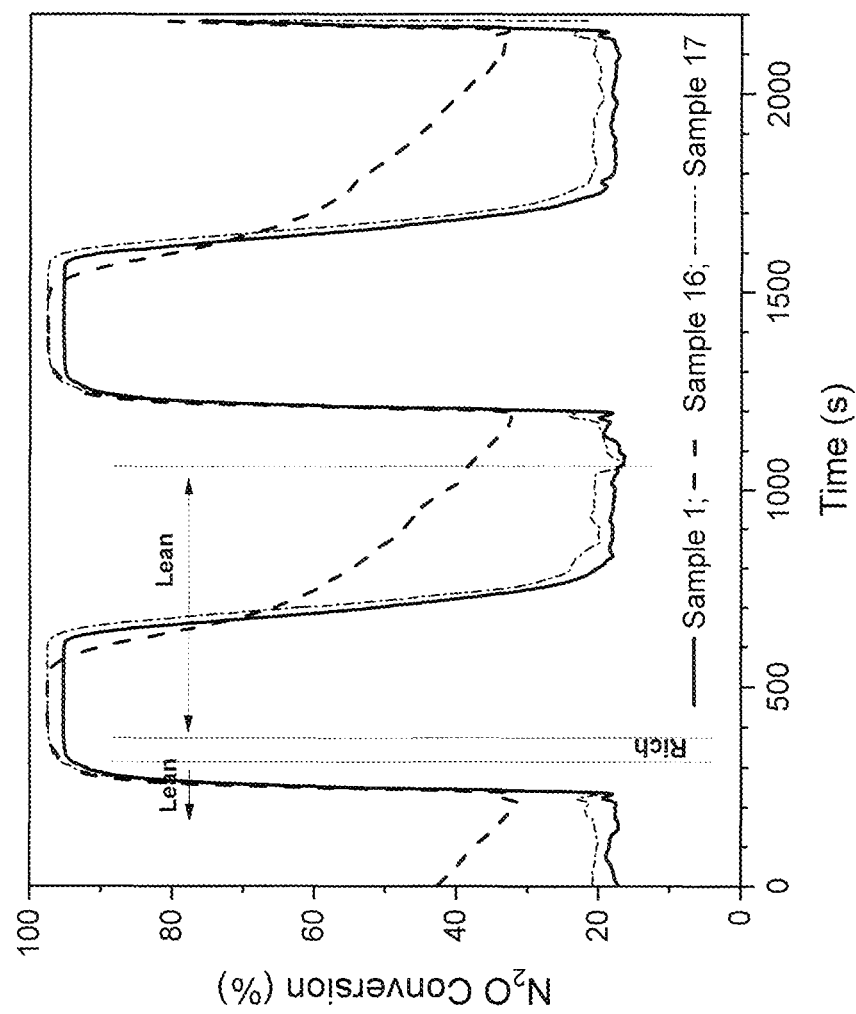
FIG. 7 is a graphical illustration of results for $N_2O$ conversion of Compositions 1, 16 and 17 as tested using Protocol B at 350° C. (as referenced in the Examples section)

FIG. 7 shows the $N_2O$ conversion for Compositions 1, 16 and 17, using Protocol B at 350° C. Composition 16, Rh—Cu bimetal catalyst, showed a strong rich exposure effect; the lean $N_2O$ conversion after the rich period was 97% and had a slower decay beyond 300 s. Therefore, integrated over the entire lean period, Rh—Cu/$CeO_2$ had a higher $N_2O$ conversion than Rh/$CeO_2$. The Rh—Ag catalyst composition, Composition 17, had a similar performance to Rh/$CeO_2$ (Composition 1).

Example 4

Figure 8:
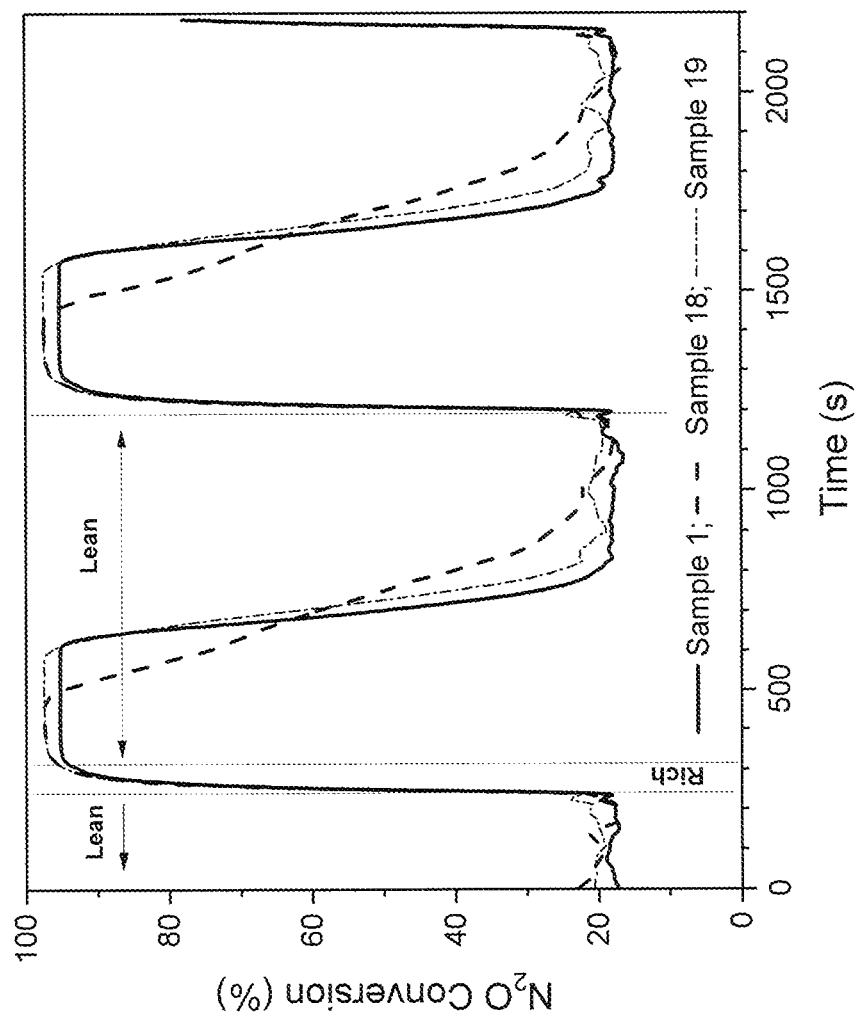
FIG. 8 is a graphical illustration of results for $N_2O$ conversion of Compositions 1, 18 and 19 as tested using Protocol B at 350° C. (as referenced in the Examples section)

FIG. 8 shows the $N_2O$ conversion for Compositions 1, 18 and 19, using Protocol B at 350° C. Composition 18 (1% Rh, 0.2% Ir) was inferior to Composition 1 (1% Rh) in both stabilized lean $N_2O$ conversion and the duration of the rich exposure effect (~190 s). Composition 19 (1% Rh, 0.02% Au), on the other hand, was slightly better than Composition 1, its $N_2O$ conversion was 98% in rich feed, and the conversion was kept at this level for 300 s after the rich period.

Example 5

Figure 9:
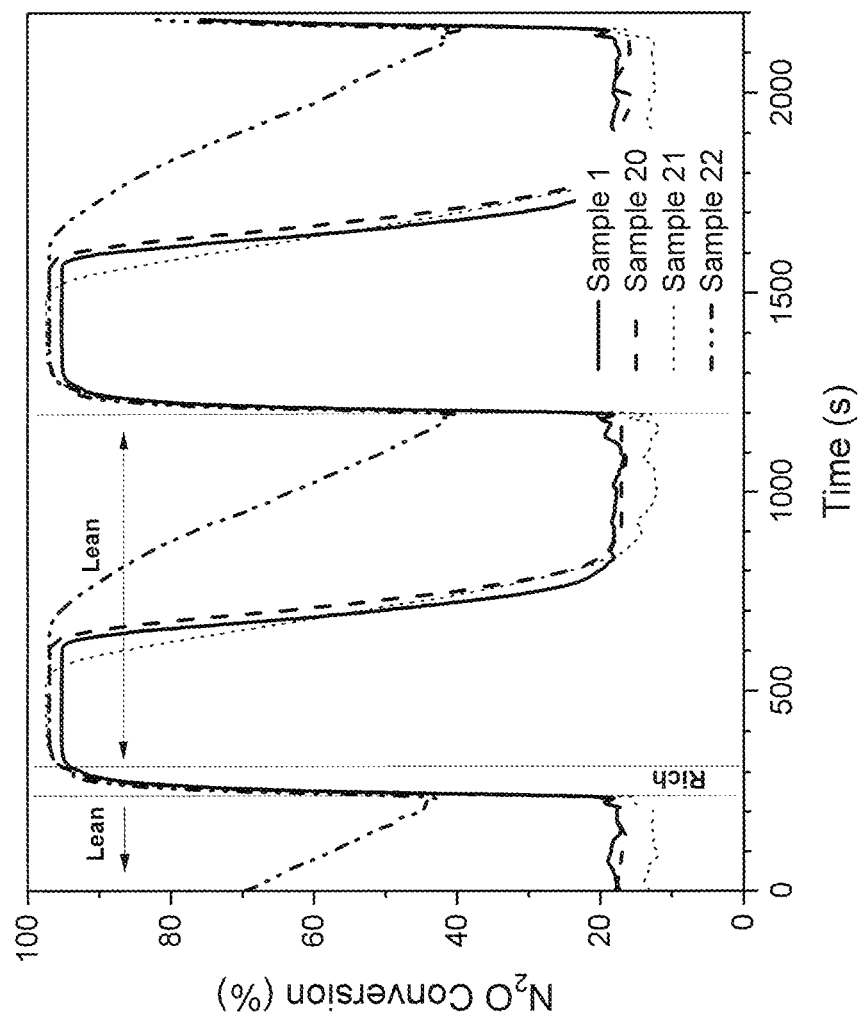
FIG. 9 is a graphical illustration of results for $N_2O$ conversion of Compositions 1 and 20-22 as tested using Protocol B at 350° C. (as referenced in the Examples section)

FIG. 9 shows the $N_2O$ conversion results for Compositions 20 to 22 in comparison to Composition 1, using Protocol B at 350° C. Composition 20 (1% Rh, 0.02% Pd) and Composition 21 (1% Rh, 0.2% Pd) were comparable to Composition 1 in stabilized lean $N_2O$ conversion and in the extent of the rich reduction effect. However, modification of the Rh catalyst composition with 0.2% Pt (Composition 22) further improved the $N_2O$ performance after the rich pulse relative to Rh/$CeO_2$; the duration of the high-level $N_2O$ conversion was extended by 76 s and the subsequent activity decay was delayed. Overall, $CeO_2$ supported Rh—Pt catalyst significantly outperformed Rh/$CeO_2$.

Example 6

Figure 10:
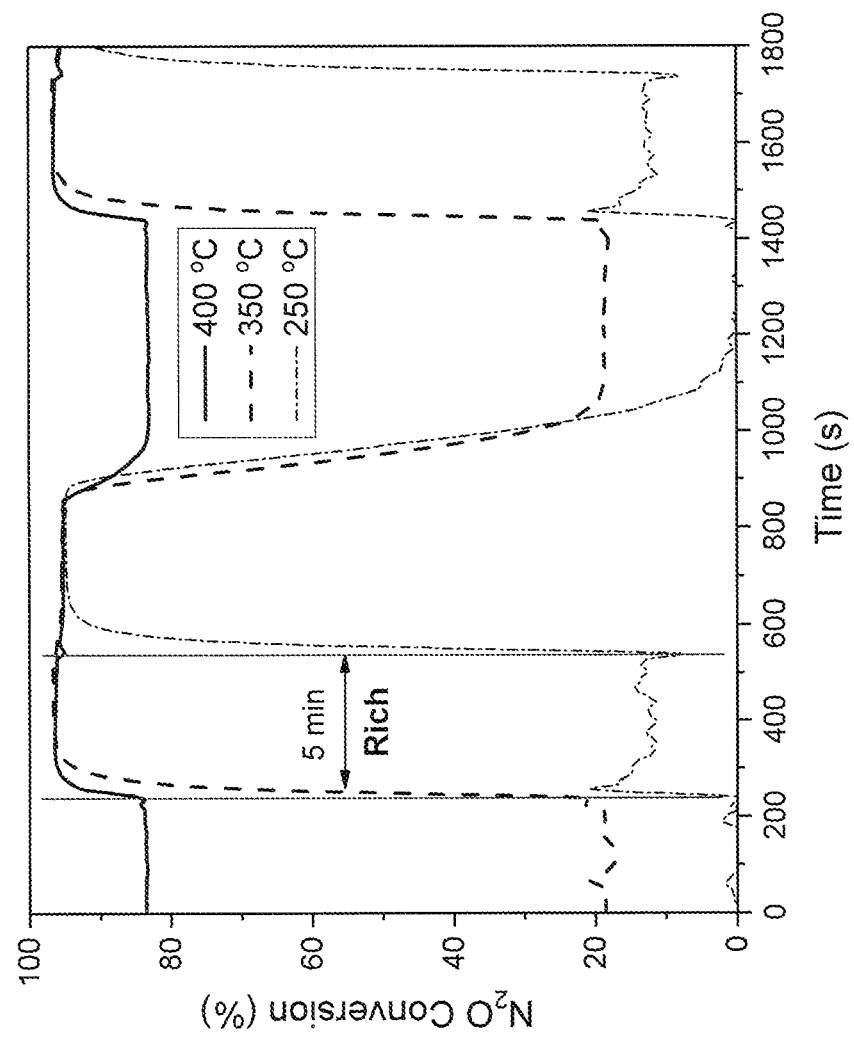
FIG. 10 is a graphical illustration of results for $N_2O$ conversion of Composition 1 as tested using Test Protocol C at 250, 350 and 400° C. (as referenced in the Examples section)

FIG. 10 shows the test results for Composition 1 using Protocol C at 250, 350 and 400° C. The catalyst composition showed very different $N_2O$ conversions before applying the rich reduction pulse (0%, 20% and 83% at 250, 350 and 400° C., respectively). Surprisingly, however, after the reduction (5 min), the $NO_x$ conversions in the lean feed were the same for the three temperatures and started to decay at about the same time point (~300 s). It is believed that this reduction effect on $N_2O$ conversion is the result of the redox property of the catalyst composition. After the reduction treatment, $N_2O$ reacts with the reduced the catalyst composition, leaving behind an oxygen atom for each $N_2O$ decomposed. This process stops when the catalyst composition is fully oxidized. Thus, one can obtain the effective oxygen storage capacity for the catalyst composition by integrating the amount of $N_2O$ molecules decomposed for the period from the end of the rich pulse to the end of activity decay. For Composition 1, the oxygen storage capacity was about 0.25 mmol O atoms/g of catalyst composition, and the capacity was not sensitive to temperature between 250 and 400° C.

Example 7

Table 2 shows the oxygen deficiency of catalyst compositions measured at 350° C. The compositions were first reduced with a reducing agent ($H_2$ or $H_2$/CO mixture), and then exposed to a $N_2O$— containing stream. This treatment resulted in increased $N_2O$ conversion. This high level of $N_2O$ conversion will eventually cease when the catalyst is oxidized by the product oxygen from the decomposition reaction. The amount of oxygen (atoms) a catalyst can hold during this process is directly related to the oxygen deficiency of the catalyst before exposing to $N_2O$. The oxygen deficiency here is an operational definition. Its value depends on the test conditions, such as reduction temperature and feed as well as the $N_2O$ decomposition temperature. For a given test protocol, the degree of oxygen deficiency also depends on the nature of the metal and the type of support. The support material should be reducible, and the metal should be able to activate $H_2$ under the reduction conditions to catalyze the reduction process.

Table 2 shows that Rh/$CeO_2$ and Ru/$CeO_2$ have much higher oxygen deficiencies than base metal (i.e., Mn, Fe, Sn, etc.) catalysts. Rh supported on $CeO_2$ is more reducible than Rh supported on $Al_2O_3$ or $SiO_2$/$ZrO_2$. Other $CeO_2$ supported precious metal catalysts (Pt, Pd, Ir) were not included in this table because they were measured only with Protocol A, which has a lean period of 2 minute, which was too short for valuation of performance of these catalyst compositions. The oxygen deficiencies of these PGM catalysts were estimated to be about 0.25 mmol/g as measured with Protocol B.

Rh metal loading. The resulting Rh/$CeO_2$ powder was then dispersed in deionized $H_2O$ to form a coating slurry with a solids content of 51%. The slurry was washcoated on a cordierite substrate (cell density=600 cells/$in^2$, wall thickness=0.10 mm), resulting in a dry gain of 1.5 g/$in^3$ and Rh loading of 30 g/$ft^3$. The coated sample was dried in air at 110° C. for 2 hours and then calcined at 500° C. for 2 hours. The obtained sample was designated as a "fresh catalyst." A catalyst sample was also thermally aged at 750° C. for 21 h in a flowing stream (15 L/min) of 10% $H_2O$ in air and designed as an "aged catalyst."

Figure 11:
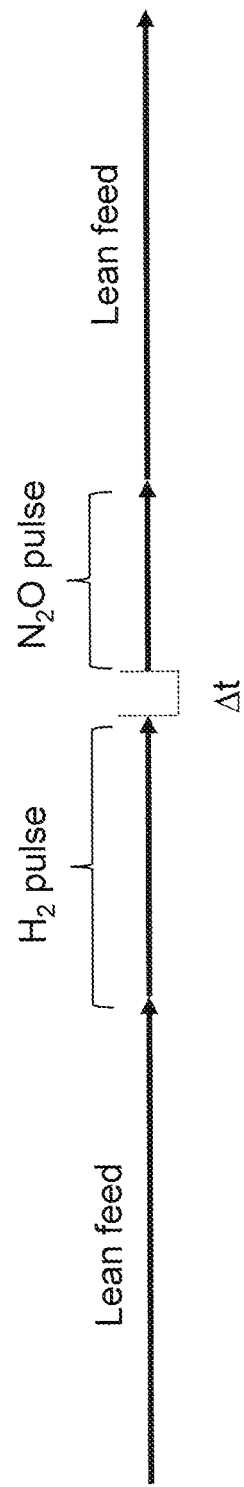
FIG. 11 is a schematic representation of the test protocol simulating the $deNO_x$ event of a LNT catalyst.

The following experiments were conducted in a lab reactor with the capability to simulate the transient operation of an internal combustion engine. Each experiment consisted of two pulses and a series of operation steps. FIG. 11 is a schematic representation of the operational sequence. The first pulse through the catalyst was a $H_2$ pulse (5-10 s), which pre-reduced (activated) the catalyst. The second pulse was a $N_2O$ pulse (100 ppm, 5 s), simulating the DeNO$_x$ event of an upstream LNT catalyst. A lean feed, consisting of 5% $H_2O$, 5% $O_2$, 5% $CO_2$, with the balance as $N_2$, was conducted following the dual pulses. $N_2O$ (100 ppm) was added to the second lean feed at a certain time point to establish the baseline performance for $N_2O$ decomposition under lean conditions. Two consecutive cycles were performed for each experiment, and only the second cycle results were used. $N_2O$ conversion was calculated based on the entire $N_2O$ pulse (Eq.1), where $N_2O_{inlet}$ is the pulse integrated $N_2O$ quantity at the inlet of the catalyst, and $N_2O_{outlet}$ is the pulse integrated $N_2O$ quantity at the outlet of the catalyst.

$$N_2O\ Conversion(\%)=(N_2O_{inlet}-N_2O_{outlet})/N_2O_{inlet} \times 100\% \qquad \text{(Equation 13)}$$

Experiments 1-8

Table 3 provides the parameters for each of the Experiments 1-8, including $H_2$ concentration in the $H_2$ pulse and

TABLE 2

Oxygen deficiency of catalyst samples measured at 350° C.

| Comp. # (as defined in Table 1) | Rh (wt. %) | Metal (wt. %) | Support | Oxygen Deficiency (mmol/g) | Measurement Method |
|---|---|---|---|---|---|
| 1 | 1.0 | | $CeO_2$ | 0.25 | Protocol B |
| 2 | 1.0 | | $Al_2O_3$ | 0.06 | Protocol A |
| 3 | 1.0 | | $ZrO_2$—$SiO_2$ | 0.05 | Protocol A |
| 6 | | 1% Ru | $CeO_2$ | 0.25 | Protocol B |
| 8 | | 1% Au | $CeO_2$ | 0.03 | Protocol A |
| 9 | | 1% Ag | $CeO_2$ | 0.04 | Protocol A |
| 10 | | 2% Mn | $CeO_2$ | 0.03 | Protocol A |
| 11 | | 2% Fe | $CeO_2$ | 0.04 | Protocol A |
| 12 | | 2% Cu | $CeO_2$ | 0.21 | Protocol A |
| 13 | | 2% Sn | $CeO_2$ | 0.02 | Protocol A |
| 14 | | 2% Co | $CeO_2$ | 0.04 | Protocol A |
| 15 | | 2% Ni | $CeO_2$ | 0.05 | Protocol A |
| 16 | 1.0 | 2% Cu | $CeO_2$ | 0.36 | Protocol B |

Example 8

A monolith (1" diameter×3" long) supported Rh/$CeO_2$ catalytic article was prepared for use in the experiments disclosed below. Rhodium nitrate solution was impregnated onto a $CeO_2$ powder support (BET surface area=144 $m^2$/g) using the incipient wetness technique to achieve a desirable the $H_2$ pulse duration, lambda ($\lambda$ value in the $N_2O$ pulse, and time delay ($\Delta$t) between the $H_2$ pulse and the $N_2O$ pulse. A negative value for $\Delta$t signifies overlap of the two pulses. Experiments 1-8 were operated at GHSV=33,000 $h^{-1}$ at a constant temperature. Experiment 1 is considered as the reference experimental conditions (10 s $H_2$ pulse with 1% $H_2$, 5 s $N_2O$ pulse with 100 ppm $N_2O$ at $\lambda$=1.0, $\Delta$t=0s).

TABLE 3

Experimental conditions for test article.

| Expt. # | Lean Feed Duration (min) | [H$_2$] (%) | H$_2$ Pulse Duration (s) | Δt (s) | λ | N$_2$O Pulse Duration (s) | Lean Feed Duration (min) | Lean feed + N$_2$O Duration (min) |
|---|---|---|---|---|---|---|---|---|
| 1 | 5 | 1   | 10 | 0  | 1.0 | 5 | 2 | 5 |
| 2 | 5 | 0.5 | 10 | 0  | 1.0 | 5 | 2 | 5 |
| 3 | 5 | 0.1 | 10 | 0  | 1.0 | 5 | 2 | 5 |
| 4 | 5 | 1   | 5  | 0  | 1.0 | 5 | 2 | 5 |
| 5 | 5 | 1   | 10 | 2  | 1.0 | 5 | 2 | 5 |
| 6 | 5 | 1   | 10 | -2 | 1.0 | 5 | 2 | 5 |
| 7 | 5 | 1   | 10 | -5 | 1.0 | 5 | 2 | 5 |
| 8 | 5 | 1   | 10 | 0  | 1.1 | 5 | 2 | 5 |

Table 4 provides results for the N$_2$O conversions for each experiment performed at 250° C. and at 300° C. on the fresh and aged N$_2$O catalysts. On the aged catalyst, N$_2$O was completely decomposed at 250° C. with catalyst pre-reduction for 10 s with 0.5% H$_2$ (Experiment 2). The aged catalyst was slightly more active than the fresh catalyst at 250° C. with 1% and 0.5% H$_2$. When the H$_2$ pulse contained 0.1% H$_2$, the N$_2$O conversion dropped to about 50% (Experiment 3). The lower N$_2$O conversion with 0.1% H$_2$ in the reduction step is likely due to the incomplete reduction of the catalyst. Reducing the reduction duration from 10 s to 5 s did not result in any decrease in N$_2$O conversion (Experiment 4); in terms of H$_2$ quantity contained in a pulse, 5 s/1% H$_2$ and 10 s/0.5% H$_2$ are equivalent.

Experiment 5 demonstrated that a 2-second pulse gap has a significant impact on the N$_2$O reduction. This is believed to be due to the high O$_2$ concentration in the lean feed, which can quickly oxidize the catalyst. On the other hand, a partial overlap of the two pulses did not decrease the N$_2$O conversion (Experiments 6 and 7). In practice, a gap between pulses can be avoided by timing the reduction step based on the LNT DeNO$_x$ event. An increase in the lambda value in the N$_2$O pulse to 1.1 (Experiment 8) moderately reduced the N$_2$O conversion due to the higher extent of catalyst oxidation by the N$_2$O feed. However, the lambda value during the initial stage of a LNT DeNO$_x$ event in actual practice is always around 1.0.

The N$_2$O decomposition in a lean feed (5% O$_2$) was also evaluated for all cycles (data not shown) to establish the lean performance baseline; the N$_2$O conversions were found to be between 0% and 3%.

TABLE 4

N$_2$O conversion (%) on fresh and aged catalysts at 250° C. and 300° C.

| Expt. # | 250° C. Fresh | 250° C. Aged | 300° C. Fresh | 300° C. Aged |
|---|---|---|---|---|
| 1 | 88 | 99 | 99 | 99 |
| 2 | 95 | 98 | 97 | 99 |
| 3 | 51 | 51 | 58 | 55 |
| 4 | 87 | 96 | 95 | 98 |
| 5 | 30 | 17 | 34 | 28 |
| 6 | 99 | 99 | 99 | 99 |
| 7 | 88 | 97 | 95 | 99 |
| 8 | 65 | 53 | 69 | 56 |

Table 5 summarizes the results obtained with the aged catalyst at different temperatures. Under standard conditions (Experiment 1), N$_2$O was completely decomposed at temperatures as low as 150° C. At this low temperature, the N$_2$O decomposition efficiency decreased with a decreased H$_2$ concentration in the H$_2$ pulse, or with decreased duration of the H$_2$ pulse (Experiments 2-4). Notably, there was little difference between N$_2$O reduction efficiency at 200° C., 250° C. and 300° C. Thus, it is expected that the N$_2$O generated during LNT deNO$_x$ can be effectively removed at temperatures of about 200° C. or greater, provided the N$_2$O catalyst is sufficiently pre-reduced, and the time gap between the reduction of the N$_2$O catalyst and the deNO$_x$ event is appropriately controlled.

TABLE 5

N$_2$O conversion (%) on aged catalyst as a function of temperature.

| Expt. # | 150° C. | 200° C. | 250° C. | 300° C. |
|---|---|---|---|---|
| 1 | 98 | 92 | 99 | 99 |
| 2 | 32 | 98 | 98 | 99 |
| 3 | 4  | 44 | 51 | 55 |
| 4 | 0  | 95 | 96 | 98 |
| 5 | 1  | 4  | 17 | 28 |
| 6 | 1  | 97 | 99 | 99 |
| 7 | 10 | 96 | 97 | 99 |
| 8 | 0  | 31 | 53 | 56 |

Reference throughout this specification to "one embodiment," "certain embodiments," "one or more embodiments" or "an embodiment" means that a particular feature, structure, material, or characteristic described in connection with the embodiment is included in at least one embodiment of the present disclosure. Thus, the appearances of the phrases such as "in one or more embodiments," "in certain embodiments," "in some embodiments," "in one embodiment," or "in an embodiment" in various places throughout this specification are not necessarily referring to the same embodiment of the present disclosure. Furthermore, the particular features, structures, materials, or characteristics may be combined in any suitable manner in one or more embodiments. All of the various embodiments, aspects, and options disclosed herein can be combined in all variations. The scope of the compositions, formulations, methods, and processes described herein include all actual or potential combinations of embodiments, aspects, options, examples, and preferences herein.

Although the embodiments disclosed herein have been described with reference to particular embodiments it is to be understood that these embodiments are merely illustrative of the principles and applications of the present disclosure. It will be apparent to those skilled in the art that various modifications and variations can be made to the methods and apparatus of the present disclosure without departing from the spirit and scope of the disclosure. Thus, it is intended that the present disclosure include modifications and variations that are within the scope of the appended claims and their equivalents, and the above-described embodiments are presented for purposes of illustration and not of limitation. All patents and publications cited herein are incorporated by reference herein for the specific teachings thereof as noted, unless other statements of incorporation are specifically provided.

What is claimed is:

1. A nitrous oxide ($N_2O$) removal catalyst composition for treating an exhaust stream of an internal combustion engine, the composition comprising:
    a platinum group metal component supported on a metal oxide-based support;
    wherein the $N_2O$ removal catalyst composition is in a substantially reduced form such that it has an oxygen deficiency of about 0.05 mmol oxygen atoms/g or greater, and
    wherein the $N_2O$ removal catalyst composition provides effective $N_2O$ removal under lean conditions at a temperature of about 350° C. or lower.

2. The $N_2O$ removal catalyst composition of claim 1, wherein the effective $N_2O$ removal is at a temperature that is from about 350° C. to about 150° C.

3. The $N_2O$ removal catalyst composition of claim 1, wherein the metal oxide-based support is a reducible metal oxide comprising ceria ($CeO_2$) or ceria in combination with one or more of zirconia, alumina, silica, titania, lanthana, baria, praseodymia, yttria, samaria, and gadolinia.

4. The $N_2O$ removal catalyst composition of claim 1, wherein the metal oxide-based support comprises $CeO_2$ in an amount of from about 56% to 100% by weight of the support on an oxide basis.

5. The $N_2O$ removal catalyst composition of claim 1, wherein the metal oxide-based support has a fresh surface area of about 40 to about 200 $m^2/g$.

6. The $N_2O$ removal catalyst composition of claim 1, wherein the platinum group metal component is present on the support in an amount of about 0.01 to about 5% by weight of the support, about 0.04 to about 3% by weight of the support, or about 1 to about 2% by weight of the support.

7. The $N_2O$ removal catalyst composition of claim 1, wherein the platinum group metal component comprises rhodium or rhodium oxide.

8. The $N_2O$ removal catalyst composition of claim 1, wherein the platinum group metal component is selected from the group consisting of rhodium, rhodium oxide, platinum, platinum oxide, palladium, palladium oxide, ruthenium, ruthenium oxide, iridium and iridium oxide.

9. The $N_2O$ removal catalyst composition of claim 7, wherein the platinum group metal component further comprises a base metal or a second platinum group metal.

10. The $N_2O$ removal catalyst composition of claim 9, wherein the base metal or second platinum group metal is present on the support in an amount of about 0.02% to about 0.2% by weight of the support.

11. The $N_2O$ removal catalyst composition of claim 9, wherein the base metal is copper or silver.

12. The $N_2O$ removal catalyst composition of claim 9, wherein the second platinum group metal is selected from the group consisting of gold, palladium, and platinum.

13. The $N_2O$ removal catalyst composition of claim 9, wherein the platinum group metal component comprises a mixture of rhodium and/or rhodium oxide and platinum and/or platinum oxide.

14. The $N_2O$ removal catalyst composition of claim 13, wherein the rhodium and/or rhodium oxide is present in an amount of about 2% by weight of the support and the platinum and/or platinum oxide is present in an amount of about 0.2% by weight of the support.

15. The $N_2O$ removal catalyst composition of claim 1, wherein the composition is substantially reduced by exposing the composition to hydrogen, carbon monoxide, hydrocarbons, ammonia, or mixtures thereof.

16. The $N_2O$ removal catalyst composition of claim 1, wherein the composition possesses an oxygen deficiency of about 0.05 to about 0.30 mmol of oxygen atoms per gram of catalyst composition, or about 0.20 to about 0.30 mmol of oxygen atoms per gram of catalyst composition.

17. The $N_2O$ removal catalyst composition of claim 1, wherein 0.2 g of the composition provides removal of about 98% of the $N_2O$ present in a lean feed for a period of about 3 minutes following a 15 second rich feed, or from about 95% to about 98% of the $N_2O$ present in a lean feed for a period of at least about 5 minutes following a 1 minute rich feed,
    wherein the lean feed consists of 200 ppm $N_2O$, 5% $CO_2$, and 5% $H_2O$ in $N_2$, at a total gas flow rate of 50 L/h; and
    wherein the rich feed consists of 200 ppm $N_2O$, 0.75% CO, 0.25% $H_2$, 5% $CO_2$, and 5% $H_2O$ in $N_2$, at a total gas flow rate of 50 L/h.

18. A catalytic article comprising the $N_2O$ removal catalyst composition of claim 1, further comprising a substrate upon which the $N_2O$ removal catalyst composition is deposited.

19. An emission treatment system for selectively reducing $N_2O$, comprising the catalytic article of claim 18, the system further comprising:
    an exhaust conduit in fluid communication with an internal combustion engine via an exhaust manifold; and
    a lean $NO_x$ trap (LNT) comprising a substrate and a LNT catalyst composition, the LNT in fluid communication with the exhaust conduit.

20. The emission treatment system of claim 19, further comprising a reducing means sufficient to provide the $N_2O$ removal catalyst composition with an oxygen deficiency of about 0.05 mmol oxygen atoms/g or greater.

21. The emission treatment system of claim 20, wherein the reducing means is a source of reductant in fluid communication with and upstream of the $N_2O$ removal catalytic article.

22. The emission treatment system of claim 21, wherein the reductant is hydrogen, carbon monoxide, hydrocarbons, ammonia, or mixtures thereof.

23. The emission treatment system of claim 21, wherein the reductant is hydrogen, and wherein the hydrogen is provided by a source selected from the group consisting of on-board hydrogen storage, hydrogen produced from alcohol reforming, hydrogen produced from ammonia decomposition, hydrogen produced from fuel reforming, and combinations thereof.

24. A method for selectively removing at least a portion of $N_2O$ in a gaseous exhaust stream, the method comprising contacting the gaseous exhaust stream with the $N_2O$ removal catalyst composition of claim 1.

25. The method of claim 24, further comprising contacting the $N_2O$ removal catalyst composition with a reductant prior to a $deNO_x$ event, providing the catalyst composition in substantially reduced form.

26. The method of claim 25, further comprising subjecting the $N_2O$ removal catalyst composition to a $deNO_x$ event wherein $N_2O$ is released, and wherein the oxygen generation capacity of the $N_2O$ released is stoichiometrically equal to or less than the oxygen deficiency of the $N_2O$ removal catalyst composition.

27. The method of claim 25, wherein the reductant is selected from the group consisting of hydrogen, carbon monoxide, hydrocarbons, ammonia, and mixtures thereof, and wherein said contacting the $N_2O$ removal catalyst composition with said reductant is conducted for a period of about 1 second to about 60 seconds.

* * * * *